US012791714B2

(12) United States Patent
Gassend et al.

(10) Patent No.: US 12,791,714 B2
(45) Date of Patent: Nov. 10, 2026

(54) METHODS AND SYSTEMS FOR DETECTING DEGRADED LIDAR RANGE MEASUREMENT ACCURACY

(71) Applicant: WAYMO LLC, Mountain View, CA (US)

(72) Inventors: Blaise Gassend, Mountain View, CA (US); Stephen Osborn, Mountain View, CA (US); Peter Morton, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 1343 days.

(21) Appl. No.: 17/435,288

(22) PCT Filed: Mar. 5, 2020

(86) PCT No.: PCT/US2020/021046

§ 371 (c)(1),
(2) Date: Aug. 31, 2021

(87) PCT Pub. No.: WO2020/181019

PCT Pub. Date: Sep. 10, 2020

(65) Prior Publication Data

US 2022/0155450 A1 May 19, 2022

Related U.S. Application Data

(60) Provisional application No. 62/814,236, filed on Mar. 5, 2019.

(51) Int. Cl.
*G01S 17/88* (2006.01)
*G01S 7/481* (2006.01)
(Continued)

(52) U.S. Cl.
CPC ............ *G01S 17/88* (2013.01); *G01S 7/4817* (2013.01); *G01S 7/484* (2013.01); *G01S 7/4865* (2013.01)

(58) Field of Classification Search
CPC ........ G01S 17/88; G01S 7/4817; G01S 7/484; G01S 7/4865; G01S 7/487; G01S 17/10; G01S 17/42; G01S 7/497; G01S 17/89
See application file for complete search history.

(56) References Cited

U.S. PATENT DOCUMENTS 9,383,753 B1 7/2016 Templeton et al.
9,874,441 B1 1/2018 Hines et al.
(Continued)

FOREIGN PATENT DOCUMENTS

CN 104160240 A 11/2014
CN 108139465 A 6/2018
(Continued)

OTHER PUBLICATIONS

Zhu Bo et al., "Measurement Method for Real-Time Transmission of Optical Signal Based on Single Photon Detection," Chinese Journal of Lasers, vol. 43, No. 2, Feb. 2016.
(Continued)

*Primary Examiner* — Yuqing Xiao
*Assistant Examiner* — Chia-Ling Chen
(74) *Attorney, Agent, or Firm* — McDonnell Boehnen Hulbert & Berghoff LLP

(57) ABSTRACT

One example method involves repeatedly scanning a range of angles in a field-of-view (FOV) of a light detection and ranging (LIDAR) device. The method also involves detecting a plurality of light pulses intercepted for each scan of the range of angles. The method also involves comparing a first scan of the range of angles with a second scan subsequent to the first scan. The method also involves detecting onset of a
(Continued)

saturation recovery period of the light detector during the first scan or the second scan based on the comparison.

20 Claims, 11 Drawing Sheets

(51) Int. Cl.
*G01S 7/484* (2006.01)
*G01S 7/4865* (2020.01)

(56) References Cited

U.S. PATENT DOCUMENTS

| | | | |
|---|---|---|---|
| 10,185,032 B2 | 1/2019 | Stutz et al. | |
| 2004/0036783 A1* | 2/2004 | Barna | H04N 25/76 348/E5.08 |
| 2007/0291249 A1 | 12/2007 | Nakamura | |
| 2009/0123158 A1 | 5/2009 | Ray et al. | |
| 2010/0128109 A1* | 5/2010 | Banks | G01S 17/894 348/46 |
| 2014/0002808 A1 | 1/2014 | Gammenthaler | |
| 2014/0085622 A1 | 3/2014 | Wong | |
| 2016/0291134 A1 | 10/2016 | Droz et al. | |
| 2017/0242106 A1 | 8/2017 | Dussan et al. | |
| 2018/0032075 A1* | 2/2018 | Valois | G01S 17/02 |
| 2018/0081061 A1 | 3/2018 | Mandai et al. | |
| 2018/0164439 A1 | 6/2018 | Droz et al. | |
| 2018/0188359 A1 | 7/2018 | Droz et al. | |
| 2018/0217242 A1 | 8/2018 | Lombrozo et al. | |
| 2018/0284229 A1 | 10/2018 | Liu et al. | |
| 2018/0284275 A1 | 10/2018 | LaChapelle | |
| 2019/0011256 A1 | 1/2019 | Otsuka et al. | |
| 2019/0018107 A1 | 1/2019 | Warke et al. | |
| 2020/0132841 A1* | 4/2020 | Lovering | G01S 17/933 |
| 2020/0158876 A1* | 5/2020 | Karadeniz | G01S 7/4808 |
| 2020/0249354 A1* | 8/2020 | Yeruhami | G01S 17/58 |
| 2021/0341592 A1* | 11/2021 | Tachino | G01C 3/06 |

FOREIGN PATENT DOCUMENTS

| | | | |
|---|---|---|---|
| CN | 109116369 A | 1/2019 | |
| CN | 109254300 A | 1/2019 | |
| JP | 2006-064468 | 3/2006 | |
| JP | 2006-249962 | 9/2006 | |
| JP | 2007-333693 | 12/2007 | |
| JP | 2012-237592 | 12/2012 | |
| JP | 2014-515527 | 6/2014 | |
| JP | 2017-020841 | 1/2017 | |
| KR | 10-1937777 | 1/2019 | |
| KR | 101937777 B1 * | 1/2019 | G01S 17/08 |
| WO | 2016/164131 | 10/2016 | |

OTHER PUBLICATIONS

The International Search Report (ISR) with Written Opinion for PCT/US2020/021046 dated Jun. 29, 2020, pp. 1-13.

Hodge et al., "In situ characterization of grain-scale fluvial morphology using Terrestrial Laser Scanning," Earth Surface Processes and Landforms, Wiley, GB, vol. 34, No. 7, Apr. 14, 2009, pp. 954-968.

* cited by examiner

METHODS AND SYSTEMS FOR DETECTING DEGRADED LIDAR RANGE MEASUREMENT ACCURACY

CROSS-REFERENCE TO RELATED APPLICATION

This application is a U.S. National Phase of International Application No. PCT/US2020/021046, filed Mar. 5, 2020, which claims priority to U.S. Provisional Application No. 62/814,236, filed Mar. 5, 2019, both of which are incorporated by reference herein in their entirety.

BACKGROUND

Active sensors, such as light detection and ranging (LIDAR) sensors, radio detection and ranging (RADAR) sensors, sound navigation and ranging (SONAR) sensors, among others, are sensors that can scan a surrounding environment by emitting signals toward the surrounding environment and detecting reflections of the emitted signals.

For example, a LIDAR sensor can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

In one example, a method is provided. The method involves repeatedly scanning a range of angles in a field-of-view (FOV) of a light detection and ranging device. The method also involves detecting, for each scan of the range of angles, a plurality of light pulses during a plurality of successive detection periods. The light detector may be configured to intercept light from a different angle in the range of angles during each of the plurality of successive detection periods of the scan. The method also involves comparing a first scan of the range of angles obtained using the light detector with a second scan subsequent to the first scan. The method also involves detecting onset of a saturation recovery period of the light detector during the first scan or the second scan based on the comparison.

In another example, a light detection and ranging (LIDAR) device is provided. The LIDAR device includes a light detector and one or more optical elements configured to direct light received by the LIDAR device from a field-of-view (FOV) onto the light detector. The LIDAR device also includes a controller configured to cause the LIDAR device to perform operations. The operations comprise repeatedly scanning the light detector across a range of angles in the FOV. The operations also comprise detecting, for each scan of the range of angles, a plurality of light pulses intercepted at the light detector during a plurality of detection periods. The light detector may be configured to intercept light form a different angle in the range of angles during each of the plurality of detection periods of the scan. The operations also comprise comparing a first scan of the range of angles obtained using the light detector with a second scan subsequent to the first scan. The operations also comprise detecting onset of a saturation recovery period of the light detector based on the comparison.

In yet another example, a method is provided. The method involves receiving, from a light detection and ranging (LIDAR) device, an indication of a plurality of scans of a range of angles in a field-of-view (FOV). The LIDAR device may be configured to repeatedly scan the range of angles using a light detector of the LIDAR device. The method also involves identifying, for each scan of the range of angles, a plurality of light pulses received at different angles in the range of angles. The plurality of light pulses may be intercepted at the light detector during different detection periods in the scan. The method also involves comparing a first scan of the range of angles obtained using the light detector with a second scan subsequent to the first scan. The method also involves identifying one or more scans of the plurality of scans obtained during a saturation recovery period of the light detector based on the comparison.

The provided methods may be computer-implemented. In this sense, for each method, computer-readable instructions may be provided which, when executed by at least one computing apparatus, cause the method to be performed.

In still another example, a system is provided. The system comprises means for repeatedly scanning a range of angles in a field-of-view (FOV) of a light detection and ranging device at a light detector of the LIDAR device. The system also comprises means for detecting, for each scan of the range of angles, a plurality of light pulses during a plurality of successive detection periods. The light detector may be configured to intercept light from a different angle in the range of angles during each of the plurality of successive detection periods of the scan. The system also comprises means for comparing a first scan of the range of angles obtained using the light detector with a second scan subsequent to the first scan. The system also comprises means for detecting onset of a saturation recovery period of the light detector during the first scan or the second scan based on the comparison.

In still another example, a system is provided. The system comprises means for receiving, from a light detection and ranging (LIDAR) device, an indication of a plurality of scans of a range of angles in a field-of-view (FOV). The LIDAR device may be configured to repeatedly scan the range of angles using a light detector of the LIDAR device. The system also comprises means for identifying, for each scan of the range of angles, a plurality of light pulses received at different angles in the range of angles. The plurality of angles may be intercepted at the light detector during different detection periods in the scan. The system also comprises means for comparing a first scan of the range of angles obtained using the light detector with a second scan subsequent to the first scan. The system also comprises means for identifying one or more scans of the plurality of scans obtained during a saturation recovery period of the light detector based on the comparison.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
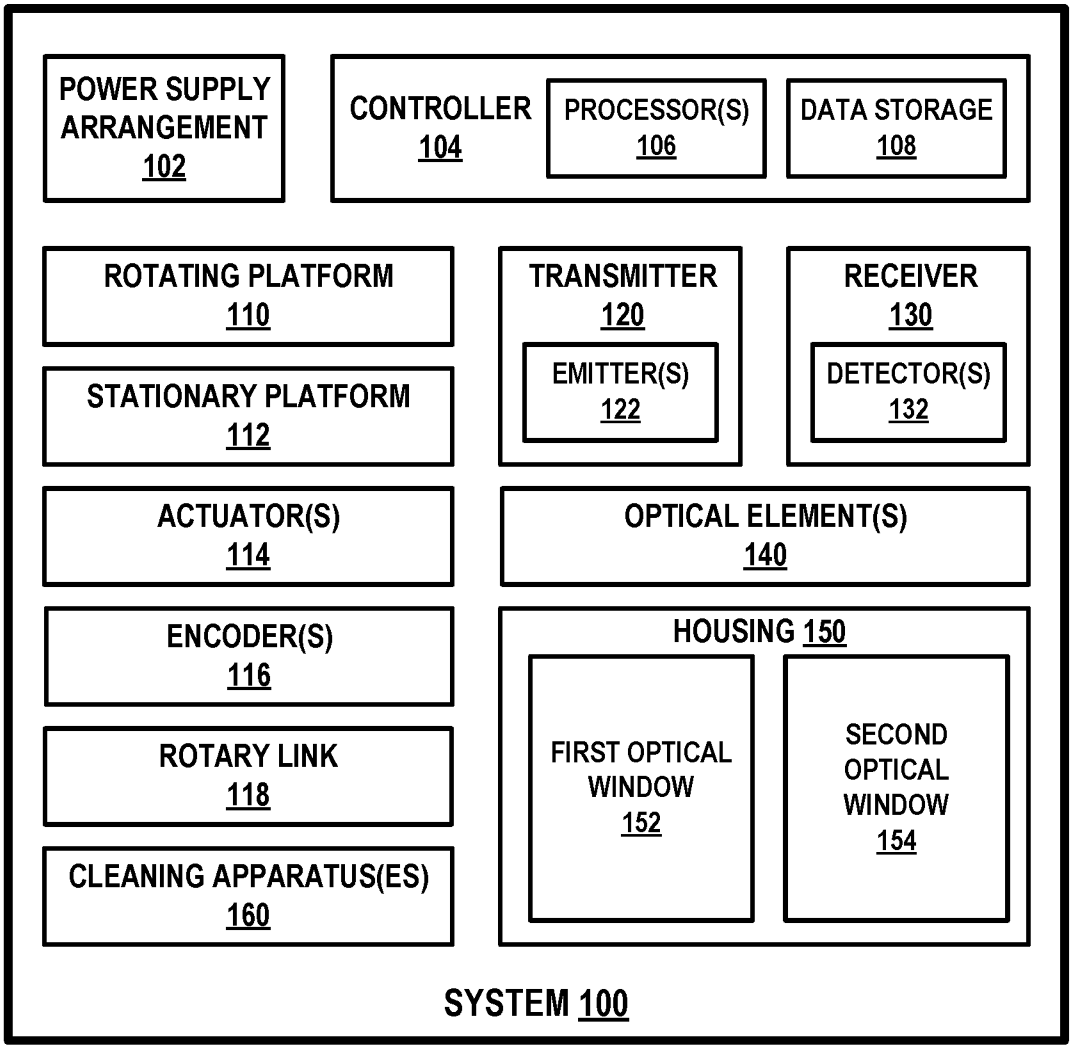
FIG. 1 is a simplified block diagram of a system, according to example embodiments.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein and illustrated in the figures, can be arranged, substituted, combined, separated, and designed in a wide variety of different configurations.

I. OVERVIEW

In some implementations, a receipt time measured for each reflected light pulse detected by a LIDAR device may correspond to a particular portion of the light pulse (e.g., beginning, peak, end, etc.). In one implementation, the receipt time may correspond to an estimate of a peak time when a maximum or peak light intensity of the reflected light pulse is detected. For instance, the time when a zero-crossing of a time derivative of an output signal from a light detector of the LIDAR device can be monitored to detect the peak time when the reflected light pulse is at its maximum value (e.g., peak light intensity of the light pulse). In some examples, the zero-crossing may be detected based on when the time derivative of the output signal falls below a threshold value (e.g., using a comparator). In this way, for instance, false detections caused by noise in the output signal can be reduced. Thus, for example, output from a comparator can be used to trigger a receipt time determination for a detected light pulse as well as an analog-to-digital conversion of the estimated peak light intensity of the detected light pulse at that receipt time.

However, the use of such detection threshold may be associated with a measurement error. For example, the time derivative of the output signal may fall below the threshold slightly before the actual zero-crossing occurs, thereby underestimating the actual receipt time. In turn, a range measurement error may be introduced when a range to an object is computed based on a time-of-flight between an emission time of an emitted light pulse and a receipt time of a reflected light pulse reflected by the object. Moreover, a magnitude of the range measurement error increases as the intensity of the detected light pulse decreases. Thus, objects that are at the same distance or range away from the LIDAR device but have different reflectivities may appear to be at different computed ranges. This intensity-dependent range error is often called a "range walk error."

To compensate for the range walk error, calibration data (e.g., look up table, etc.) that relates the range error to the measured light intensity of a detected light pulse can be determined for a LIDAR device (and/or for each receiver in the LIDAR device).

However, in some scenarios, the accuracy of light intensity measurements indicated by a light detector may be temporarily degraded. By way of example, the light detector may be configured to provide an output signal (e.g., voltage, current, etc.) that varies based on the intensity of light incident on the light detector according to a predetermined sensor response behavior (e.g., output signal could be proportional to the intensity of the incident light, etc.). However, the actual response behavior of the light detector could sometimes deviate from the expected or predetermined sensor response behavior.

In one scenario, the light detector may become saturated if it receives a relatively high intensity of incident light (e.g., a reflected light pulse from a retroreflector). After the light detector becomes saturated, the actual sensor response behavior of the light detector may deviate from the expected response behavior for a short period of time, which may be referred to herein as a "saturation recovery period." During the saturation recovery period for instance, output signals from the light detector may correspond to relatively lower light intensity values than when detected outside the saturation recovery period. In this instance, light pulses measured during the saturation recovery period may appear to be generally dimmer than they would if they were instead measured outside the saturation recovery period. In turn, the light pulses measured during the saturation recovery period may be deemed to be reflected off a dimmer object than the actual object that reflected those light pulses. As a result of this perceived dimmer reflectivity of the object, a range error may be introduced in time-of-flight computations for these detected light pulses (e.g., inaccurate range walk error estimates for correcting the receipt times of the light pulses).

Some example implementations herein relate to the detection and mitigation of degraded LIDAR range measurement accuracy.

One example method involves repeatedly scanning a range of angles in a field-of-view (FOV) of the LIDAR device. For example, the LIDAR device may include beam-steering optics configured to steer incident light, received by the LIDAR device during a first scan at different angles between a minimum angle of the range and a maximum angle of the range, onto the light detector. Then, in a subsequent second scan, the same beam-steering optics may be configured to steer incident light in a similar manner onto the light detector, and so on. In this way for instance, light pulses arriving at the LIDAR device from that same particular range of angles can be repeatedly monitored using the light detector during a series of detection periods.

In one specific embodiment, light from a range of pitch angles of a vertical FOV of the LIDAR device can be steered repeatedly (e.g., via a rotating mirror, etc.) onto the light detector. In other embodiments, the repeatedly scanned range of angles may correspond to a range of yaw angles or any other sequence of angles in the FOV across which the light detector is repeatedly scanned.

In some examples, the method also involves comparing a first scan of the range of angles with a second scan subsequent to the first scan; and detecting onset of a saturation recovery period of the light detector based on the comparison.

By way of an example, the LIDAR device may be configured to scan the same range of angles frequently (e.g., tens, hundreds, thousands or more times per second, etc.). In this example, a sudden change in the reflectivities of reflective surfaces in that range of angles between two consecutive scans may be less likely than the occurrence of a saturation event that causes a sudden change in the light intensity measurements indicated by the light detector in the two consecutive scans. Thus, in this example, the light intensity measurements of consecutive scans can be monitored for sudden changes as a basis for detecting onset of the saturation recovery period.

In an example embodiment, a maximum value of all the light pulse peak intensities measured during the first scan can be compared with a corresponding maximum value of the light pulse peak intensities measured during the second subsequent scan of the range of angles. The maximum value in each scan may correspond to the brightest object (e.g., highest reflectivity object) in the range of angles scanned. If the difference between the two maximum values is greater than a threshold difference (e.g., 60%, or any other threshold difference), then the LIDAR device (or other computer processing data from the LIDAR device) could determine that the light detector has entered a saturation recovery period during the first scan or the second scan.

Additionally, in some examples, the method may also involve identifying one or more scans of the range of angles that are obtained using the light detector during the saturation recovery period. For example, the LIDAR device may flag the one or more scans for adjusting time-of-flight computations and/or other scanning computations that use data collected for light pulses detected during the saturation recovery period.

In one example, the method may also involve generating a point cloud representation of the FOV based on data from the LIDAR device. In these examples, the method may also involve adjusting a foreign object debris (FOD) detection threshold (e.g., a threshold used to identify and/or exclude small objects or other debris in the environment from being represented in the point cloud representation) for the identified one or more scans obtained using the light detector during the saturation recovery period. For example, the FOD detection threshold can be increased temporarily to filter the point cloud for data points that appear to be objects (e.g., bumps, ripples, protrusions, etc., in the point cloud) due to the range measurement errors associated with the saturation recovery period.

In another example, the method may involve adjusting time-of-flight computations for light pulses detected during the saturation recovery period. For example, a first intensity-range calibration mapping can be used for computing the range measurements of light pulses detected during the saturation recovery period, and a second different intensity-range calibration mapping can be used for computing the range measurements of light pulses detected outside the saturation recovery period. Other examples are possible as well.

II. EXAMPLE SYSTEMS AND DEVICES

A non-exhaustive list of example sensors of the present disclosure includes LIDAR sensors, RADAR sensors, SONAR sensors, active IR cameras, and/or microwave cameras, among others. To that end, some example sensors herein may include active sensors that emit a signal (e.g., visible light signal, infrared light signal, radio-frequency signal, microwave signal, sound signal, etc.), and then detect reflections of the emitted signal from the surrounding environment.

FIG. 1 is a simplified block diagram of a system 100, according to example embodiments. As shown, system 100 includes a power supply arrangement 102, a controller 104, a rotating platform 110, a stationary platform 112, one or more actuators 114, one or more encoders 116, a rotary link 118, a transmitter 120, a receiver 130, one or more optical elements 140, a housing 150, and one or more cleaning apparatuses 160. In some embodiments, system 100 may include more, fewer, or different components. Additionally, the components shown may be combined or divided in any number of ways.

Power supply arrangement 102 may be configured to supply, receive, and/or distribute power to various components of system 100. To that end, power supply arrangement 102 may include or otherwise take the form of a power source (e.g., battery cells, etc.) disposed within system 100 and connected to various components of the system 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which system 100 is mounted) and to transmit the received power to various components of system 100.

Controller 104 may include one or more electronic components and/or systems arranged to facilitate certain operations of system 100. Controller 104 may be disposed within system 100 in any feasible manner. In one embodiment, controller 104 may be disposed, at least partially, within a central cavity region of rotary link 118.

In some examples, controller 104 may include or otherwise be coupled to wiring used for transfer of control signals to various components of system 100 and/or for transfer of data from various components of system 100 to controller 104. For example, the data that controller 104 receives may include sensor data indicating detections of signals by receiver 130, among other possibilities. Moreover, the control signals sent by controller 104 may operate various components of system 100, such as by controlling emission of signals by transmitter 120, controlling detection of signals by the receiver 130, and/or controlling actuator(s) 114 to rotate rotating platform 110, among other possibilities.

As shown, controller 104 may include one or more processors 106 and data storage 108. In some examples, data storage 108 may store program instructions executable by processor(s) 106 to cause system 100 to perform the various operations described herein. To that end, processor(s) 106 may comprise one or more general-purpose processors and/or one or more special-purpose processors. To the extent that controller 104 includes more than one processor, such processors could work separately or in combination. In some examples, data storage 108 may comprise one or more volatile and/or one or more non-volatile storage components, such as optical, magnetic, and/or organic storage, and data storage 108 may be optionally integrated in whole or in part with the processor(s).

In some examples, controller 104 may communicate with an external controller or the like (e.g., a computing system arranged in a vehicle to which system 100 is mounted) so as to help facilitate transfer of control signals and/or data between the external controller and the various components of system 100. Additionally or alternatively, in some examples, controller 104 may include circuitry wired to perform one or more of the operations described herein. For example, controller 104 may include one or more pulser circuits that provide pulse timing signals for triggering emission of pulses or other signals by transmitter 120. Additionally or alternatively, in some examples, controller 104 may include one or more special purpose processors, servos, or other types of controllers. For example, controller 104 may include a proportional-integral-derivative (PID) controller or other control loop feedback mechanism that operates actuator(s) 114 to cause the rotating platform to rotate at a particular frequency or phase. Other examples are possible as well.

Rotating platform 110 may be configured to rotate about an axis. To that end, rotating platform 110 can be formed from any solid material suitable for supporting one or more components mounted thereon. For example, transmitter 120 and receiver 130 may be arranged on rotating platform 110 such that each of these components moves relative to the environment based on rotation of rotating platform 110. In particular, these components could be rotated about an axis so that system 100 may obtain information from various directions. For instance, where the axis of rotation is a vertical axis, a pointing direction of system 100 can be adjusted horizontally by actuating the rotating platform 110 about the vertical axis.

Stationary platform 112 may take on any shape or form and may be configured for coupling to various structures, such as to a top of a vehicle, a robotic platform, assembly line machine, or any other system that employs system 100 to scan its surrounding environment, for example. Also, the coupling of the stationary platform may be carried out via any feasible connector arrangement (e.g., bolts, screws, etc.).

Actuator(s) 114 may include motors, pneumatic actuators, hydraulic pistons, and/or piezoelectric actuators, and/or any other types of actuators. In one example, actuator(s) 114 may include a first actuator configured to actuate the rotating platform 110 about the axis of rotation of rotating platform 110. In another example, actuator(s) 114 may include a second actuator configured to rotate one or more components of system 100 about a different axis of rotation. For instance, the second actuator may rotate an optical element (e.g., mirror, etc.) about a second axis (e.g., horizontal axis, etc.) to adjust a direction of an emitted light pulse (e.g., vertically, etc.). In yet another example, actuator(s) 114 may include a third actuator configured to tilt (or otherwise move) one or more components of system 100. For instance, the third actuator can be used to move or replace a filter or other type of optical element 140 along an optical path of an emitted light pulse, or can be used to tilt rotating platform (e.g., to adjust the extents of a field-of-view (FOV) scanned by system 100, etc.), among other possibilities.

Encoder(s) 116 may include any type of encoder (e.g., mechanical encoders, optical encoders, magnetic encoders, capacitive encoders, etc.). In general, encoder(s) 116 may be configured to provide rotational position measurements of a device that rotates about an axis. In one example, encoder(s) 116 may include a first encoder coupled to rotating platform 110 to measure rotational positions of platform 110 about an axis of rotation of platform 110. In another example, encoder (s) 116 may include a second encoder coupled to a mirror (or other optical element 140) to measure rotational positions of the mirror about an axis of rotation of the mirror.

Rotary link 118 directly or indirectly couples stationary platform 112 to rotating platform 110. To that end, rotary link 118 may take on any shape, form and material that provides for rotation of rotating platform 110 about an axis relative to the stationary platform 112. For instance, rotary link 118 may take the form of a shaft or the like that rotates based on actuation from actuator(s) 114, thereby transferring mechanical forces from actuator(s) 114 to rotating platform 110. In one implementation, rotary link 118 may have a central cavity in which one or more components of system 100 may be disposed. In some examples, rotary link 118 may also provide a communication link for transferring data and/or instructions between stationary platform 112 and rotating platform 110 (and/or components thereon such as transmitter 120 and receiver 130).

Transmitter 120 may be configured to transmit signals toward an environment of system 100. As shown, transmitter 120 may include one or more emitters 122. Emitters 122 may include various types of emitters depending on a configuration of system 100.

In a first example, where system 100 is configured as a LIDAR device, transmitter 120 may include one or more light emitters 122 that emit one or more light beams and/or pulses having wavelengths within a wavelength range. The wavelength range could be, for example, in the ultraviolet, visible, and/or infrared portions of the electromagnetic spectrum. In some examples, the wavelength range can be a narrow wavelength range, such as that provided by lasers. A non-exhaustive list of example light emitters 122 includes laser diodes, diode bars, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), fiber lasers, and/or any other device configured to selectively transmit, reflect, and/or emit light to provide a plurality of emitted light beams and/or pulses.

In a second example, where system 100 is configured as an active infrared (IR) camera, transmitter 120 may include one or more emitters 122 configured to emit IR radiation to illuminate a scene. To that end, transmitter 120 may include any type of emitter (e.g., light source, etc.) configured to provide the IR radiation.

In a third example, where system 100 is configured as a RADAR device, transmitter 120 may include one or more antennas, waveguides, and/or other type of RADAR signal emitters 122, that are configured to emit and/or direct modulated radio-frequency (RF) signals toward an environment of system 100.

In a fourth example, where system 100 is configured as a SONAR device, transmitter 120 may include one or more acoustic transducers, such as piezoelectric transducers, magnetostrictive transducers, electrostatic transducers, and/or other types of SONAR signal emitters 122, that are configured to emit a modulated sound signal toward an environment of system 100. In some implementations, the acoustic transducers can be configured to emit sound signals within a particular wavelength range (e.g., infrasonic, ultrasonic, etc.). Other examples are possible as well.

In some implementations, system 100 (and/or transmitter 120) can be configured to emit a plurality of signals (e.g., light beams, IR signals, RF waves, sound waves, etc.) in a relative spatial arrangement that defines a FOV of system 100. For example, each beam (or signal) may be configured to propagate toward a portion of the FOV. In this example, multiple adjacent (and/or partially overlapping) beams may be directed to scan multiple respective portions of the FOV during a scan operation performed by system 100. Other examples are possible as well.

Receiver 130 may include one or more detectors 132 configured to detect reflections of the signals emitted by transmitter 120.

In a first example, where system 100 is configured as a RADAR device, receiver 130 may include one or more antennas (i.e., detectors 132) configured to detect reflections of the RF signal transmitted by transmitter 120. To that end, in some implementations, the one or more antennas of transmitter 120 and receiver 130 can be physically implemented as the same physical antenna structures.

In a second example, where system 100 is configured as a SONAR device, receiver 130 may include one or more sound sensors 110 (e.g., microphones, etc.) that are configured to detect reflections of the sound signals emitted by transmitter 120.

In a third example, where system 100 is configured as an active IR camera, receiver 130 may include one or more light detectors 132 (e.g., charge-coupled devices (CCDs), etc.) that are configured to detect a source wavelength of IR light transmitted by transmitter 120 and reflected off a scene toward receiver 130.

In a fourth example, where system 100 is configured as a LIDAR device, receiver 130 may include one or more light detectors 132 arranged to intercept and detect reflections of the light pulses or beams emitted by transmitter 120 that return to system 100 from the environment. Example light detectors 132 may include photodiodes, avalanche photodiodes (APDs), silicon photomultipliers (SiPMs), single photon avalanche diodes (SPADs), multi-pixel photon counters (MPPCs), phototransistors, cameras, active pixel sensors (APS), charge coupled devices (CCD), cryogenic detectors, and/or any other sensor of light. In some instances, receiver 130 may be configured to detect light having wavelengths in the same wavelength range as the light emitted by transmitter 120. In this way, for instance, system 100 may distinguish received light originated by system 100 from other light originated by external sources in the environment.

In some implementations, receiver 130 may include a detector comprising an array of sensing elements connected to one another. For instance, where system 100 is configured as a LIDAR device, multiple light sensing elements could be connected in parallel to provide a photodetector array having a larger light detection area (e.g., combination of the sensing surfaces of the individual detectors in the array, etc.) than a detection area of a single sensing element. The photodetector array could be arranged in a variety ways. For instance, the individual detectors of the array can be disposed on one or more substrates (e.g., printed circuit boards (PCBs), flexible PCBs, etc.) and arranged to detect incoming light that is traveling along an optical path of an optical lens of system 100 (e.g., optical element(s) 140). Also, such a photodetector array could include any feasible number of detectors arranged in any feasible manner.

In some examples, system 100 can select or adjust a horizontal scanning resolution by changing a rate of rotation of system 100 (and/or transmitter 120 and receiver 130). Additionally or alternatively, the horizontal scanning resolution can be modified by adjusting a pulse rate of signals emitted by transmitter 120. In a first example, transmitter 120 may be configured to emit pulses at a pulse rate of 15,650 pulses per second, and to rotate at 10 Hz (i.e., ten complete 360° rotations per second) while emitting the pulses. In this example, receiver 130 may have a 0.23° horizontal angular resolution (e.g., horizontal angular separation between consecutive pulses). In a second example, if system 100 is instead rotated at 20 Hz while maintaining the pulse rate of 15,650 pulses per second, then the horizontal angular resolution may become 0.46°. In a third example, if transmitter 120 emits the pulses at a rate of 31,300 pulses per second while maintaining the rate of rotation of 10 Hz, then the horizontal angular resolution may become 0.115°. In some examples, system 100 can be alternatively configured to scan a particular range of views within less than a complete 360° rotation of system 100. Other implementations are possible as well.

It is noted that the pulse rates, angular resolutions, rates of rotation, and viewing ranges described above are only for the sake of example, and thus each of these scanning characteristics could vary according to various applications of system 100.

Optical element(s) 140 can be optionally included in or otherwise coupled to transmitter 120 and/or receiver 130. In one example, optical element(s) 140 can be arranged to direct light emitted by emitter(s) 122 toward a scene (or a region therein). In another example, optical element(s) 140 can be arranged to focus light from the scene (or a region therein) toward detector(s) 132. As such, optical element(s) 140 may include any feasible combination of optical elements, such as filters, apertures, mirror(s), waveguide(s), lens(es), or other types optical components, that are arranged to guide propagation of light through physical space and/or to adjust a characteristic of the light.

In some examples, controller 104 could operate actuator 114 to rotate rotating platform 110 in various ways so as to obtain information about the environment. In one example, rotating platform 110 could be rotated in either direction. In another example, rotating platform 110 may carry out complete revolutions such that system 100 scans a 360° view of the environment. Moreover, rotating platform 110 could rotate at various frequencies so as to cause system 100 to scan the environment at various refresh rates. In one embodiment, system 100 may be configured to have a refresh rate of 3-30 Hz, such as 10 Hz (e.g., ten complete rotations of system 100 per second). Other refresh rates are possible as well.

Alternatively or additionally, system 100 may be configured to adjust the pointing direction of an emitted signal (emitted by transmitter 120) in various ways. In one implementation, signal emitters (e.g., light sources, antennas, acoustic transducers, etc.) of transmitter 120 can be operated according to a phased array configuration or other type of beam steering configuration.

In a first example, where system 100 is configured as a LIDAR device, light sources or emitters in transmitter 120 can be coupled to phased array optics that control the phase of light waves emitted by the light sources. For instance, controller 104 can be configured to adjust the phased array optics (e.g., phased array beam steering) to change the effective pointing direction of a light signal emitted by transmitter 120 (e.g., even if rotating platform 110 is not rotating).

In a second example, where system 100 is configured as a RADAR device, transmitter 120 may include an array of antennas, and controller 104 can provide respective phase-shifted control signals for each individual antenna in the array to modify a pointing direction of a combined RF signal from the array (e.g., phased array beam steering).

In a third example, where system 100 is configured as a SONAR device, transmitter 120 may include an array of acoustic transducers, and controller 104 can similarly operate the array of acoustic transducers (e.g., via phase-shifted control signals, phased array beam steering, etc.) to achieve a target pointing direction of a combined sound signal emitted by the array (e.g., even if rotating platform 110 is not rotating, etc.).

Housing 150 may take on any shape, form, and material and may be configured to house one or more components of system 100. In one example, housing 150 can be a dome-shaped housing. Further, in some examples, housing 150 may be composed of or may include a material that is at least partially non-transparent, which may allow for blocking of at least some signals from entering the interior space of the housing 150 and thus help mitigate thermal and noise effects of ambient signals on one or more components of system 100. Other configurations of housing 150 are possible as well.

In some examples, housing 150 may be coupled to rotating platform 110 such that housing 150 is configured to rotate based on rotation of rotating platform 110. In these examples, transmitter 120, receiver 130, and possibly other components of system 100 may each be disposed within housing 150. In this manner, transmitter 120 and receiver 130 may rotate along with housing 150 while being disposed within housing 150. In other examples, housing 150 may be coupled to stationary platform 112 or other structure such that housing 150 does not rotate with the other components rotated by rotating platform 110.

As shown, housing 150 can optionally include a first optical window 152 and a second optical window 154. Thus, in some examples, housing 150 may define an optical cavity in which one or more components disposed inside the housing (e.g., transmitter 120, receiver 130, etc.) are optically isolated from external light in the environment, except for light that propagates through optical windows 152 and 154. With this arrangement for instance, system 100 (e.g., in a LIDAR configuration, etc.) may reduce interference from external light (e.g., noise, etc.) with signals transmitted by transmitter 120 and/or reflections of the transmitted signal received by receiver 130.

To that end, in some embodiments, optical windows 152 and 154 may include a material that is transparent to the wavelengths of light emitted by emitters 122 and/or one or more other wavelengths. For example, each of optical windows 152 and 154 may be formed from a glass substrate or a plastic substrate, among others. Additionally, in some examples, each of optical windows 152 and 154 may include or may be coupled to a filter that selectively transmits wavelengths of light transmitted by emitter(s) 122, while reducing transmission of other wavelengths. Optical windows 152 and 154 may have various thicknesses. In one embodiment, optical windows 152 and 154 may have a thickness between 1 millimeter and 2 millimeters. Other thicknesses are possible as well.

In some examples, second optical window 154 may be located at an opposite side of housing 150 from first optical window 152.

Cleaning apparatus(es) 160 can be optionally included in system 100 to facilitate cleaning one or more components (e.g., optical element(s) 140, etc.) of system 100. To that end, cleaning apparatus 160 may include one or more cleaning mechanisms. A first example cleaning apparatus 160 may include a liquid spray configured to deposit liquid on one or more components of system 100 (e.g., optical element(s) 140, housing 150, etc.). For instance, the liquid can be applied to attempt dissolving or mechanically removing an occlusion (e.g., dirt, dust, etc.) disposed on a surface of an optical component. A second example cleaning apparatus 160 may include a high-pressure gas pump configured to apply gas onto an occlusion on a surface of an optical component. A third example cleaning apparatus 160 may include a wiper (e.g., similar to a windshield wiper) configured to attempt removing an occlusion from a surface of a component in system 100. Other examples are possible.

It is noted that this arrangement of system 100 is described for exemplary purposes only and is not meant to be limiting. As noted above, in some examples, system 100 can be alternatively implemented with fewer components than those shown. In one example, system 100 can be implemented without rotating platform 100. For instance, transmitter 120 can be configured to transmit a plurality of signals spatially arranged to define a particular FOV of system 100 (e.g., horizontally and vertically) without necessarily rotating transmitter 120 and receiver 130. In another example, housing 150 may be configured to include a single optical window (instead of two optical windows 152, 154). For instance, in a LIDAR implementation of system 100, LIDAR 100 may obtain a single complete scan of a FOV during a given scan period by transmitting light pulses through the single optical window only (i.e., instead of obtaining two scans of the same FOV simultaneously by transmitting light pulses through two separate optical windows). Other examples are possible as well.

Figure 2A:
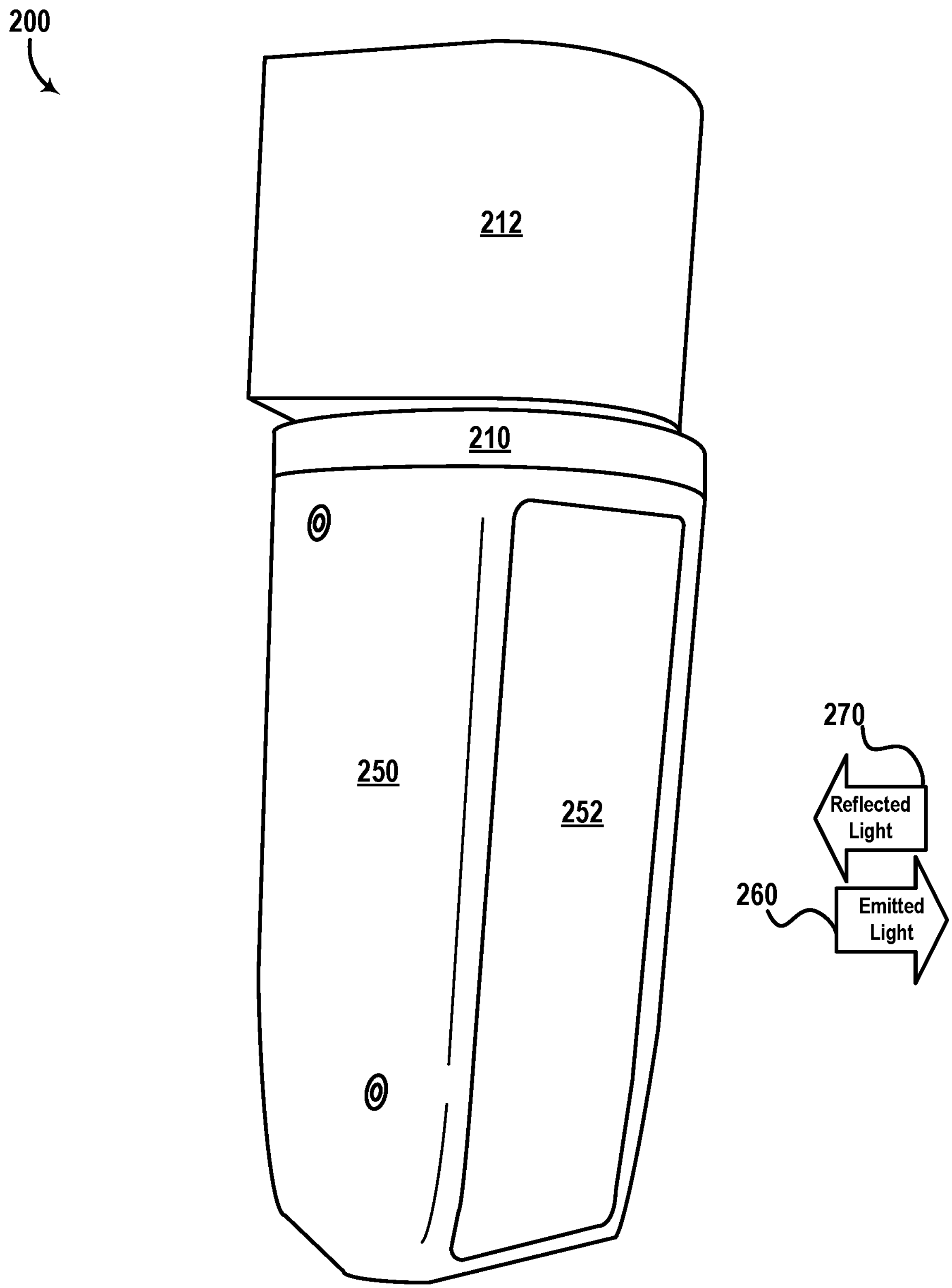
FIG. 2A illustrates a LIDAR device, according to example embodiments.

FIG. 2A illustrates a LIDAR device 200, according to example embodiments. As shown, LIDAR 200 includes a rotating platform 210, a stationary platform 212, and a housing 250 that are similar, respectively, to rotating platform 110, stationary platform 112, and housing 150 of system 100.

LIDAR 200 may be configured to scan an environment by emitting light 260 toward the environment, and detecting reflect portions (e.g., reflected light 270) of the emitted light returning to LIDAR 200 from the environment. Further, to adjust a FOV scanned by LIDAR 200 (i.e., the region illuminated by emitted light 260), rotating platform 210 may be configured to rotate housing 250 (and one or more components included therein) about an axis of rotation of rotating platform 210. For instance, where the axis of rotation of platform 210 is a vertical axis, rotating platform 210 may adjust the direction of emitted light 260 horizontally to define the horizontal extents of the FOV of LIDAR 200.

As shown, LIDAR 200 also includes an optical window 252 through which emitted light 260 is transmitted out of housing 250, and through which reflected light 270 enters into housing 250. Although not shown, housing 250 may also include another optical window located at an opposite side of housing 250 from optical window 252. Thus, housing 250 may define an optical cavity in which one or more components disposed inside the housing (e.g., transmitter, receiver, etc.) are optically isolated from external light in the environment, except for light that propagates through one or more optical windows. With this arrangement for instance, LIDAR 200 may reduce interference from external light (e.g., noise, etc.) with transmitted signals 260 and/or reflected signals 270.

To that end, in some embodiments, optical window 252 may include a material that is transparent to the wavelengths of emitted light 270 and/or one or more other wavelengths. For example, optical window 252 may be formed from a glass substrate or a plastic substrate, among others. Additionally, in some examples, optical window 252 may include or may be coupled to a filter that selectively transmits wavelengths of emitted light 260, while reducing transmission of other wavelengths through the optical window 252. Optical window 252 may have various thicknesses. In one embodiment, optical window 252 may have a thickness between 1 millimeter and 2 millimeters. Other thicknesses are possible.

Figure 2B:
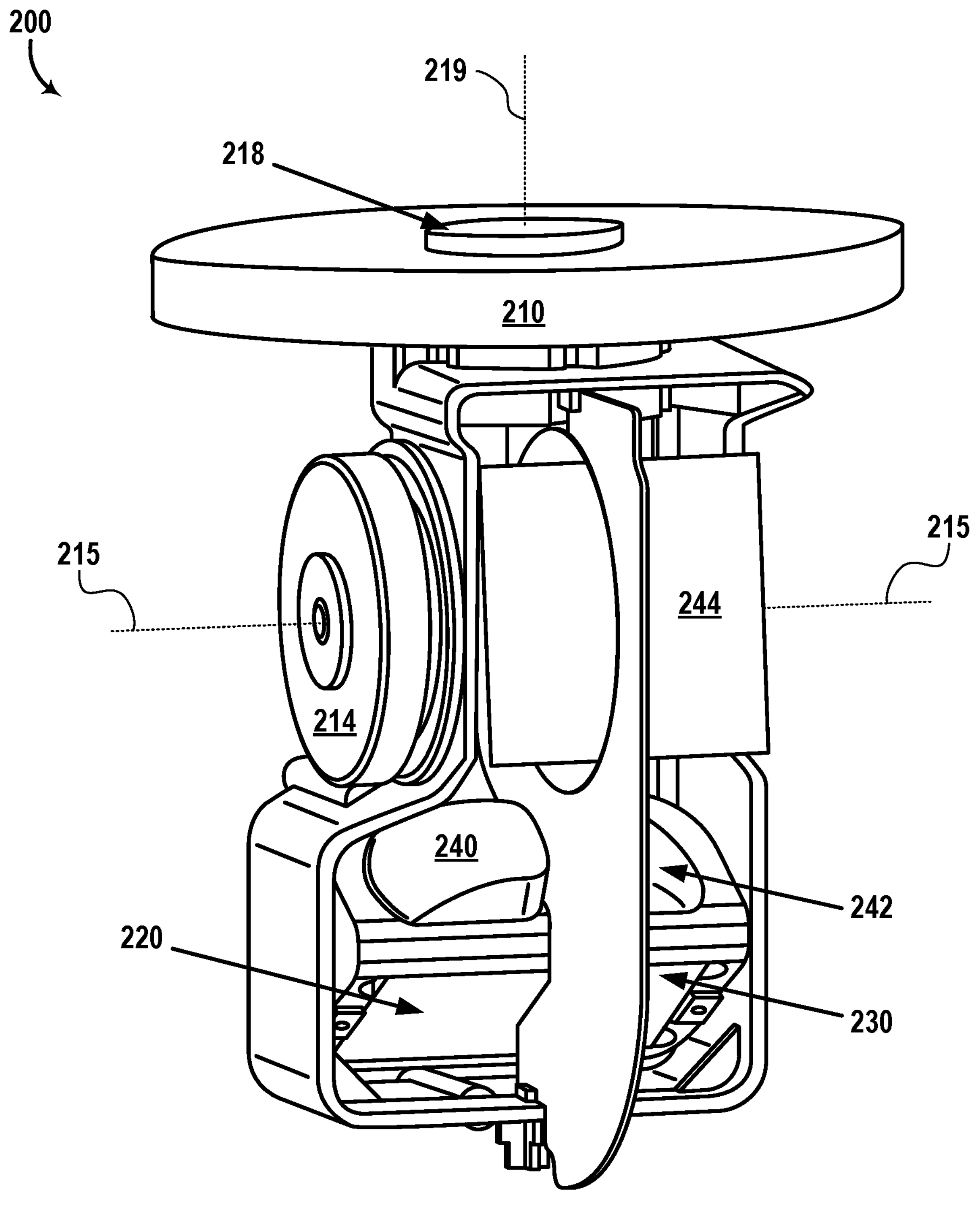
FIG. 2B illustrates a partial perspective view of the LIDAR device.

FIG. 2B illustrates a partial cross-section view of LIDAR 200. It is noted that some of the components of LIDAR 200 (e.g., platform 212, housing 250, and optical window 252) are omitted from the illustration of FIG. 2B for convenience in description.

As shown in FIG. 2B, LIDAR device 200 also includes actuators 214 and 218, which may be similar to actuators 114 of system 100. Additionally, as shown, LIDAR 200 includes a transmitter 220 and a receiver 230, which may be similar, respectively, to transmitter 120 and receiver 130 of system 100. Additionally, as shown, LIDAR 200 includes one or more optical elements (i.e., a transmit lens 240, a receive lens 242, and a mirror 244), which may be similar to optical elements 140 of system 100.

Actuators 214 and 218 may include a stepper motor, an electric motor, a combustion motor, a pancake motor, a piezoelectric actuator, or any other type of actuator, such as those describe for actuators 114 of system 100.

As shown, actuator 214 may be configured to rotate the mirror 244 about a first axis 215, and actuator 218 may be configured to rotate rotating platform 210 about a second axis 219. In some embodiments, axis 215 may correspond to a horizontal axis of LIDAR 200 and axis 219 may correspond to a vertical axis of LIDAR 200 (e.g., axes 215 and 219 may be aligned substantially perpendicular to one another).

In an example operation, LIDAR transmitter 220 may emit light (via transmit lens 240) that reflects off mirror 244 to propagate away from LIDAR 200 (e.g., as emitted light 260 shown in FIG. 2A). Further, received light from the environment of LIDAR 200 (including light 270 shown in FIG. 2A) may be reflected off mirror 244 toward LIDAR receiver 230 (via lens 242). Thus, for instance, a vertical scanning direction of LIDAR 200 can be controlled by rotating mirror 244 (e.g., about a horizontal axis 215), and a horizontal scanning direction of LIDAR 200 can be controlled by rotating LIDAR 200 about a vertical axis (e.g., axis 219) using rotating platform 210.

In this example, mirror 244 could be rotated while transmitter 220 is emitting a series of light pulses toward the mirror. Thus, depending on the rotational position of the mirror about axis 215, each light pulse could thus be steered (e.g., vertically). As such, LIDAR 200 may scan a vertical FOV defined by a range of (vertical) steering directions provided by mirror 244 (e.g., based on a range of angular positions of mirror 244 about axis 215). In some examples, LIDAR 200 may be configured to rotate mirror 244 one or more complete rotations to steer emitted light from transmitter 220 (vertically). In other examples, LIDAR device 200 may be configured to rotate mirror 244 within a given range of angles to steer the emitted light over a particular range of directions (vertically). Thus, LIDAR 200 may scan a variety of vertical FOVs by adjusting the rotation of mirror 244. In one embodiment, the vertical FOV of LIDAR 200 is 110°.

Continuing with this example, platform 210 may be configured to rotate the arrangement of components supported thereon (e.g., mirror 244, motor 214, lenses 240 and 242, transmitter 220, and receiver 230) about a vertical axis (e.g., axis 219). Thus, LIDAR 200 may rotate platform 210 to steer emitted light (from transmitter 220) horizontally (e.g., about the axis of rotation 219 of platform 210). Additionally, the range of the rotational positions of platform 210 (about axis 219) can be controlled to define a horizontal FOV of LIDAR 200. In one embodiment, platform 210 may rotate within a defined range of angles (e.g., 270°, etc.) to provide a horizontal FOV that is less than 360°. However, other amounts of rotation are possible as well (e.g., 360°, 8°, etc.) to scan any horizontal FOV.

Figure 2C:
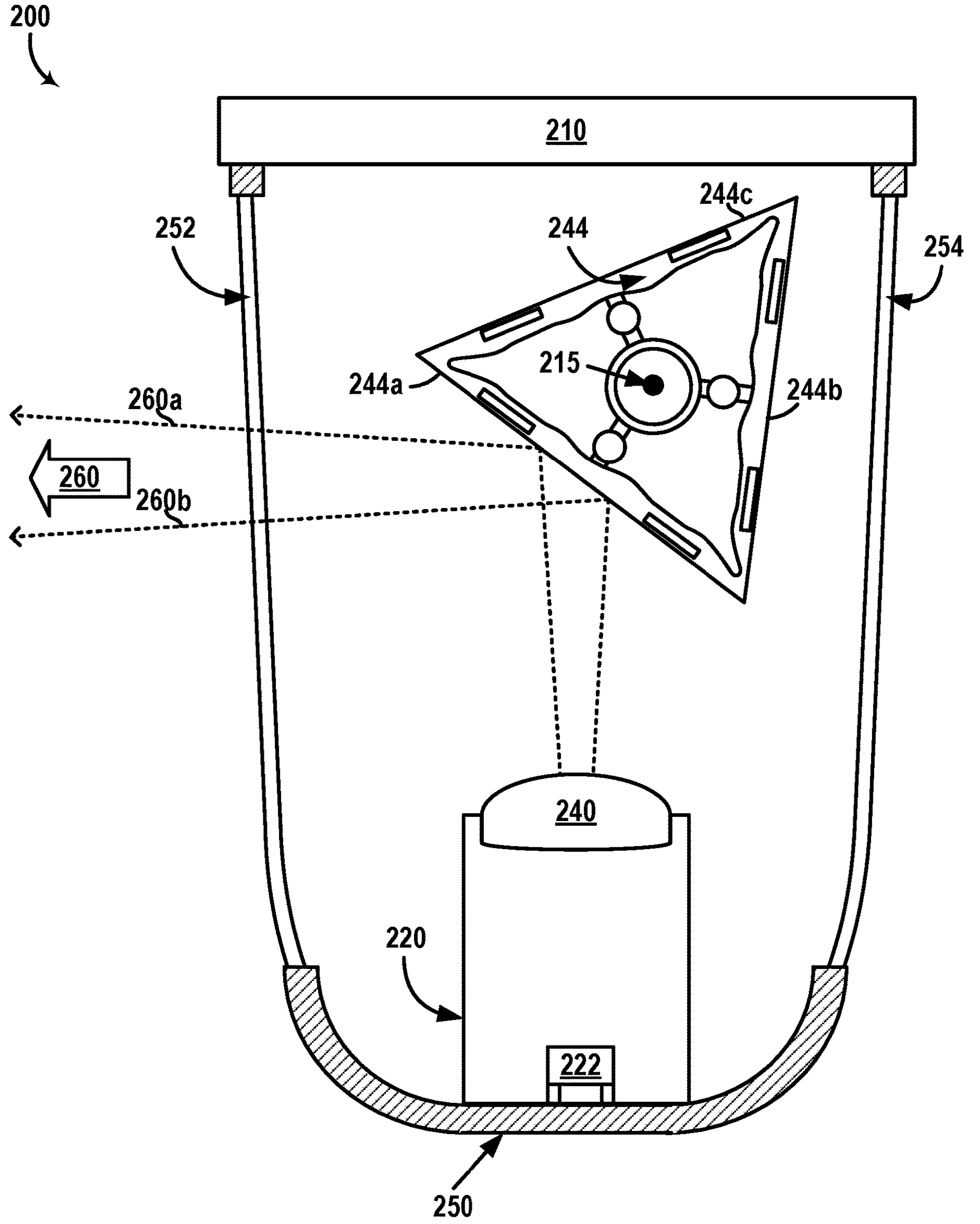
FIG. 2C illustrates a partial cross-section view of the LIDAR device.

FIG. 2C illustrates a partial cross-section view of LIDAR device 200. It is noted that some of the components of LIDAR 200 are omitted from the illustration of FIG. 2C for convenience in description. In the cross-section view of FIG. 2C, axis 215 may be perpendicular to (and may extend through) the page.

As shown in FIG. 2C, LIDAR 200 also includes a second optical window 254 that is positioned opposite to optical window 252. Optical window 254 may be similar to optical window 252. For example, optical window 254 may be configured to transmit light into and/or out of the optical cavity defined by housing 250.

As shown in FIG. 2C, transmitter 220 includes an emitter 222, which may include any of the light sources described for emitter(s) 122, for instance. In alternative embodiments, transmitter 220 may include more than one light source. Emitter 222 may be configured to emit one or more light pulses 260 (e.g., laser beams, etc.). Transmit lens 240 may be configured to direct (and/or collimate) the emitted light from emitter 222 toward mirror 244. For example, transmit lens 240 may collimate the light from the emitter to define a beam width of the light beam 260 transmitted out of LIDAR 200 (e.g., the beam divergence angle between dotted lines 260*a* and 260*b*).

As shown in FIG. 2C, mirror 244 may include three reflective surfaces 244*a*, 244*b*, 244*c* (e.g., triangular mirror). In alternative examples, mirror 244 may instead include additional or fewer reflective surfaces. In the example shown, the emitted light transmitted through transmit lens 240 may then reflect off reflective surface 244*a* toward the environment of LIDAR 200 in the direction illustrated by arrow 260. Thus, in this example, as mirror 244 is rotated (e.g., about axis 215), emitted light 260 may be steered to have a different direction (e.g., pitch direction, etc.) than that illustrated by arrow 260. For example, the direction 260 of the emitted light could be adjusted based on the rotational position of triangular mirror 244.

Additionally, in some examples, emitted light 260 may be steered out of housing 250 through optical window 252 or through optical window 254 depending on the rotational position of mirror 244 about axis 215. Thus, in some examples, LIDAR 200 may be configured to steer emitted light beam 260 within a wide range of directions (e.g., vertically), and/or out of either side of housing 250 (e.g., the sides where optical windows 252 and 252 are located).

Figure 2D:
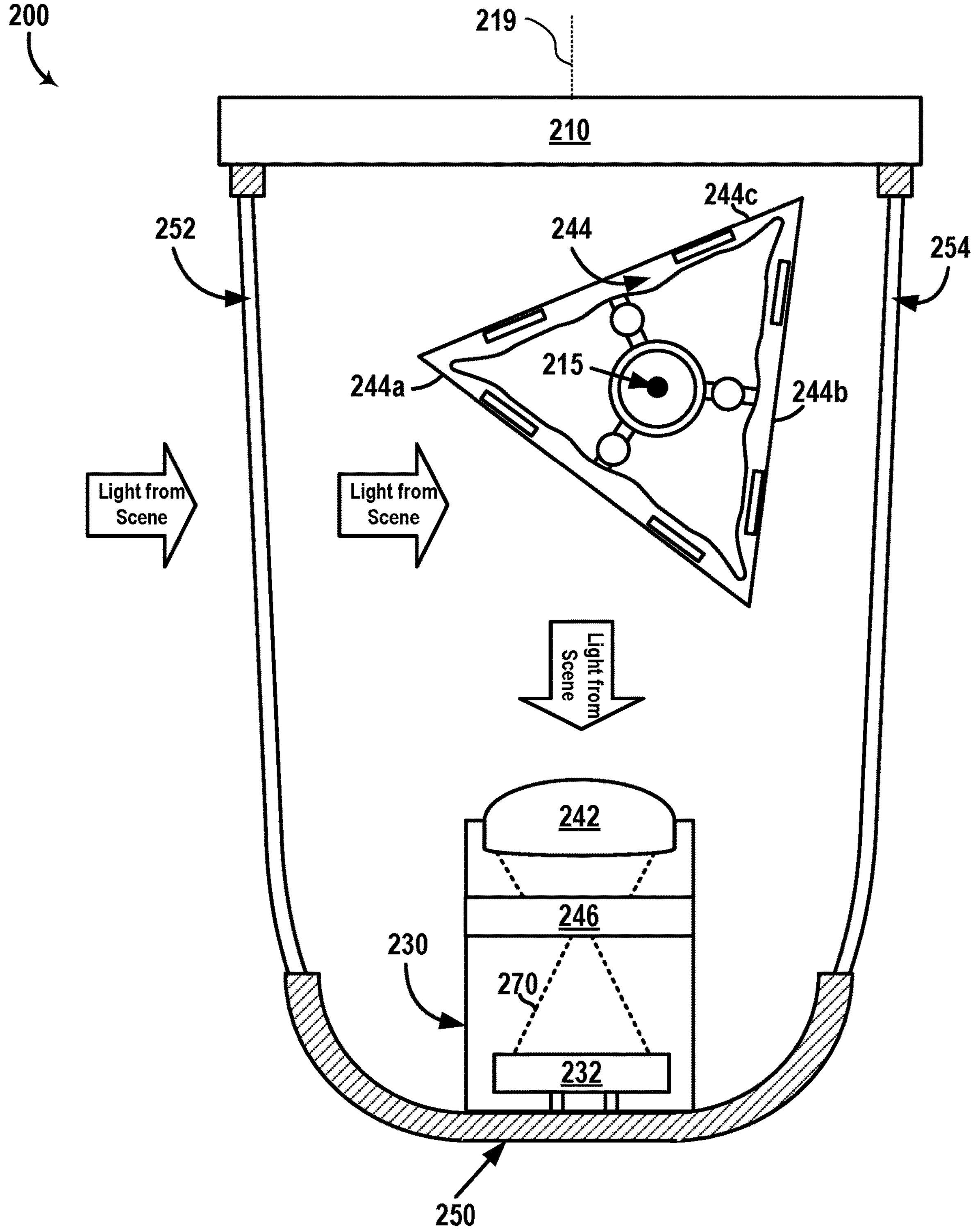
FIG. 2D illustrates another partial cross-section view of the LIDAR device.

FIG. 2D illustrates another partial cross-section view of LIDAR device 200. It is noted that some of the components of LIDAR 200 are omitted from the illustration of FIG. 2D for convenience in description. As shown, receiver 230 includes one or more light detectors 232, which may be similar to detector(s) 112 of system 100. Further, as shown, receiver 230 includes a diaphragm 246 between receive lens 246 and detector(s) 232.

Diaphragm 246 may include one or more optical elements (e.g., aperture stop, filter, etc.) configured to select a portion the light focused by receive lens 242 for transmission toward detector(s) 232.

For example, receive lens 242 may be configured to focus light received from the scene scanned by LIDAR 200 (e.g., light from the scene that enters window 252 or window 254 and is reflected by mirror 244) toward diaphragm 246. In line with the discussion above, detector(s) 232 may be arranged (or aligned) to intercept a portion of the focused light that includes light from the target region illuminated by transmitter 220. To facilitate this, for example, diaphragm 246 may include an aperture positioned and/or sized to transmit the portion of the focused light associated with the target region through the aperture as diverging light (e.g., including reflected light 270) for detection by detector(s) 232.

It is noted that the various positions, shapes, and sizes of the various components of LIDAR 200, the light beams emitted by LIDAR 200, and/or the light beams received by LIDAR 200 may vary and are not necessarily to scale, but are illustrated as shown in FIGS. 2A-2D for convenience in description. Additionally, it is noted that LIDAR 200 may alternatively include additional, fewer, or different components than those shown in FIGS. 2A-2D.

In one alternative implementation, housing 250 may be configured to include a single optical window (instead of two optical windows 252 and 254). For example, LIDAR 200 may be configured to obtain a single complete scan of the FOV of LIDAR 200 during each rotation of the housing 250 across the range of yaw angles associated with the horizontal extents of the FOV of LIDAR 200. In this example, LIDAR 200 may be configured to transmit light pulses through the single optical window during the rotation of housing 250 to obtain a single scan of the FOV during a given scan period (i.e., instead of obtaining two scans of the same FOV by transmitting light pulses through two separate optical windows simultaneously over the given scan period).

In another alternative implementation, LIDAR 200 may include a beam-steering apparatus comprising one or more optical components instead of or in addition to mirror 244. In this implementation, LIDAR 200 may be configured to scan the scene by steering the transmitted and/or received light beams through optical windows 252 and/or 254 using various arrangements of beam-steering optical elements.

Some example implementations herein involve a vehicle includes at least one sensor, such as system 100, device 200, and/or other types of sensors (e.g., RADARs, SONARs, cameras, other active sensors, etc.). However, an example sensor disclosed herein can also be used for various other purposes and may be incorporated in or otherwise connected to any feasible system or arrangement. For instance, an example LIDAR device herein can be used in an assembly line setting to monitor objects (e.g., products) being manufactured in the assembly line. Other examples are possible as well.

Some example LIDAR devices herein may be used with any type of vehicle, including conventional automobiles as well as automobiles having an autonomous or semi-autonomous mode of operation. Further, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, etc.

Figure 3:
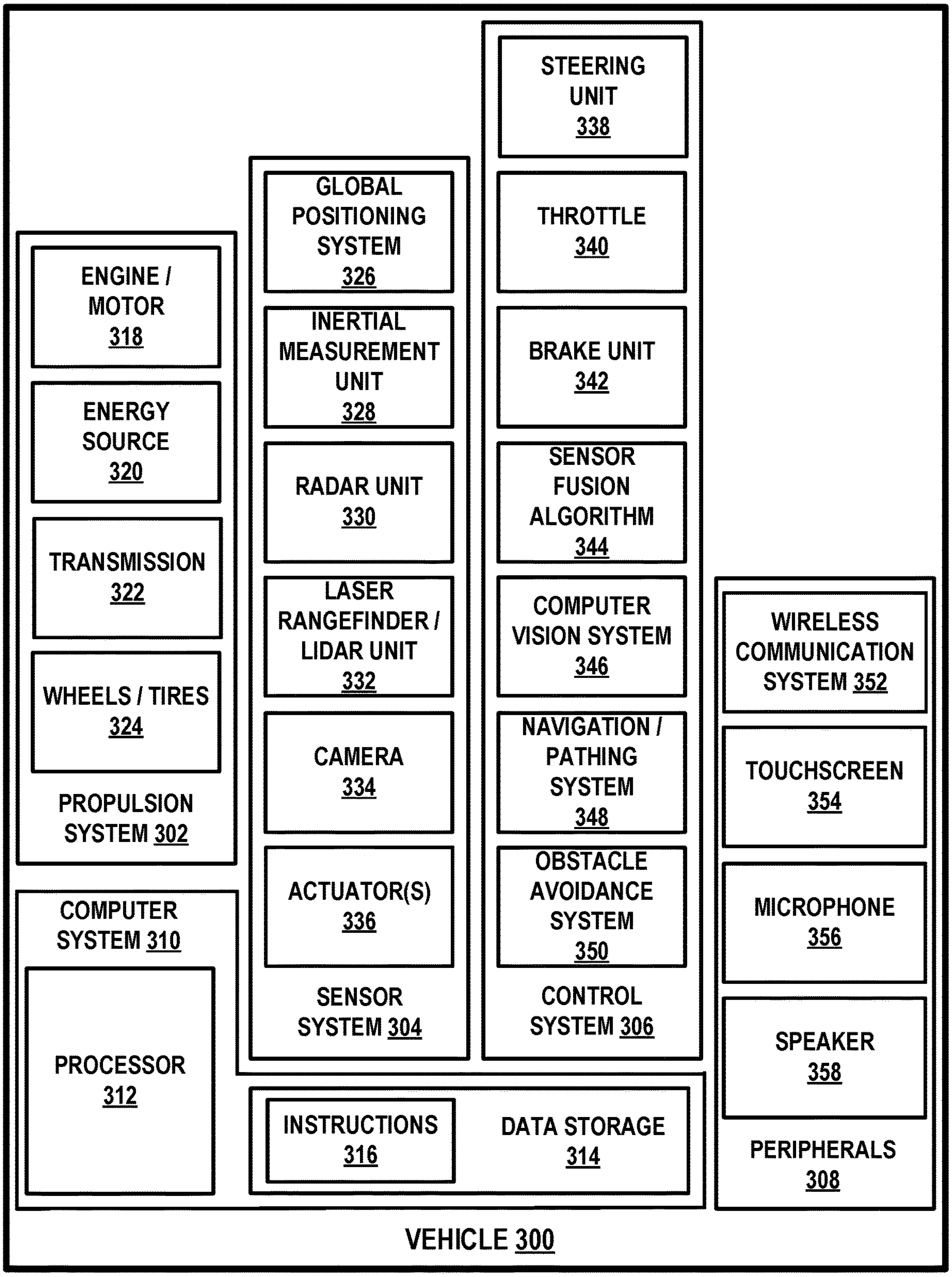
FIG. 3 is a simplified block diagram of a vehicle, according to example embodiments.

FIG. 3 is a simplified block diagram of a vehicle 300, according to an example embodiment. As shown, the vehicle 300 includes a propulsion system 302, a sensor system 304, a control system 306, peripherals 308, and a computer system 310. In some embodiments, vehicle 300 may include more, fewer, or different systems, and each system may include more, fewer, or different components. Additionally, the systems and components shown may be combined or divided in any number of ways. For instance, control system 306 and computer system 310 may be combined into a single system.

Propulsion system 302 may be configured to provide powered motion for the vehicle 300. To that end, as shown, propulsion system 302 includes an engine/motor 318, an energy source 320, a transmission 322, and wheels/tires 324.

The engine/motor 318 may be or include any combination of an internal combustion engine, an electric motor, a steam engine, and a Sterling engine. Other motors and engines are possible as well. In some embodiments, propulsion system 302 may include multiple types of engines and/or motors. For instance, a gas-electric hybrid car may include a gasoline engine and an electric motor. Other examples are possible.

Energy source 320 may be a source of energy that powers the engine/motor 318 in full or in part. That is, engine/motor 318 may be configured to convert energy source 320 into mechanical energy. Examples of energy sources 320 include gasoline, diesel, propane, other compressed gas-based fuels, ethanol, solar panels, batteries, and other sources of electrical power. Energy source(s) 320 may additionally or alternatively include any combination of fuel tanks, batteries, capacitors, and/or flywheels. In some embodiments, energy source 320 may provide energy for other systems of the vehicle 300 as well. To that end, energy source 320 may additionally or alternatively include, for example, a rechargeable lithium-ion or lead-acid battery. In some embodiments, energy source 320 may include one or more banks of batteries configured to provide the electrical power to the various components of vehicle 300.

Transmission 322 may be configured to transmit mechanical power from the engine/motor 318 to the wheels/tires 324. To that end, transmission 322 may include a gearbox, clutch, differential, drive shafts, and/or other elements. In embodiments where the transmission 322 includes drive shafts, the drive shafts may include one or more axles that are configured to be coupled to the wheels/tires 324.

Wheels/tires 324 of vehicle 300 may be configured in various formats, including a unicycle, bicycle/motorcycle, tricycle, or car/truck four-wheel format. Other wheel/tire formats are possible as well, such as those including six or more wheels. In any case, wheels/tires 324 may be configured to rotate differentially with respect to other wheels/tires 324. In some embodiments, wheels/tires 324 may include at least one wheel that is fixedly attached to the transmission 322 and at least one tire coupled to a rim of the wheel that could make contact with the driving surface. Wheels/tires 324 may include any combination of metal and rubber, or combination of other materials. Propulsion system 302 may additionally or alternatively include components other than those shown.

Sensor system 304 may include a number of sensors configured to sense information about an environment in which the vehicle 300 is located, as well as one or more actuators 336 configured to modify a position and/or orientation of the sensors. As shown, sensor system 304 includes a Global Positioning System (GPS) 326, an inertial measurement unit (IMU) 328, a RADAR unit 330, a laser rangefinder and/or LIDAR unit 332, and a camera 334. Sensor system 304 may include additional sensors as well, including, for example, sensors that monitor internal systems of the vehicle 300 (e.g., an $O_2$ monitor, a fuel gauge, an engine oil temperature, etc.). Other sensors are possible as well.

GPS 326 may be any sensor (e.g., location sensor) configured to estimate a geographic location of vehicle 300. To this end, the GPS 326 may include a transceiver configured to estimate a position of the vehicle 300 with respect to the Earth.

IMU 328 may be any combination of sensors configured to sense position and orientation changes of the vehicle 300 based on inertial acceleration. In some embodiments, the combination of sensors may include, for example, accelerometers, gyroscopes, compasses, etc.

RADAR unit 330 may be any sensor configured to sense objects in the environment in which the vehicle 300 is located using radio signals. In some embodiments, in addition to sensing the objects, RADAR unit 330 may additionally be configured to sense the speed and/or heading of the objects.

Similarly, laser range finder or LIDAR unit 332 may be any sensor configured to sense objects in the environment in which vehicle 300 is located using lasers. For example, LIDAR unit 332 may include one or more LIDAR devices, which may be similar to system 100 and/or device 200 among other possible LIDAR configurations.

Camera 334 may be any camera (e.g., a still camera, a video camera, etc.) configured to capture images of the environment in which the vehicle 300 is located. To that end, camera 334 may take any of the forms described above.

Control system 306 may be configured to control one or more operations of vehicle 300 and/or components thereof. To that end, control system 306 may include a steering unit 338, a throttle 340, a brake unit 342, a sensor fusion algorithm 344, a computer vision system 346, navigation or pathing system 348, and an obstacle avoidance system 350.

Steering unit 338 may be any combination of mechanisms configured to adjust the heading of vehicle 300. Throttle 340 may be any combination of mechanisms configured to control engine/motor 318 and, in turn, the speed of vehicle 300. Brake unit 342 may be any combination of mechanisms configured to decelerate vehicle 300. For example, brake unit 342 may use friction to slow wheels/tires 324. As another example, brake unit 342 may convert kinetic energy of wheels/tires 324 to an electric current.

Sensor fusion algorithm 344 may be an algorithm (or a computer program product storing an algorithm) configured to accept data from sensor system 304 as an input. The data may include, for example, data representing information sensed by sensor system 304. Sensor fusion algorithm 344 may include, for example, a Kalman filter, a Bayesian network, a machine learning algorithm, an algorithm for some of the functions of the methods herein, or any other sensor fusion algorithm. Sensor fusion algorithm 344 may further be configured to provide various assessments based on the data from sensor system 304, including, for example, evaluations of individual objects and/or features in the environment in which vehicle 300 is located, evaluations of particular situations, and/or evaluations of possible impacts based on particular situations. Other assessments are possible as well.

Computer vision system 346 may be any system configured to process and analyze images captured by camera 334 in order to identify objects and/or features in the environment in which vehicle 300 is located, including, for example, traffic signals and obstacles. To that end, computer vision system 346 may use an object recognition algorithm, a Structure from Motion (SFM) algorithm, video tracking, or other computer vision techniques. In some embodiments, computer vision system 346 may additionally be configured to map the environment, track objects, estimate the speed of objects, etc.

Navigation and pathing system 348 may be any system configured to determine a driving path for vehicle 300. Navigation and pathing system 348 may additionally be configured to update a driving path of vehicle 300 dynamically while vehicle 300 is in operation. In some embodiments, navigation and pathing system 348 may be configured to incorporate data from sensor fusion algorithm 344, GPS 326, LIDAR unit 332, and/or one or more predetermined maps so as to determine a driving path for vehicle 300.

Obstacle avoidance system 350 may be any system configured to identify, evaluate, and avoid or otherwise negotiate obstacles in the environment in which vehicle 300 is located. Control system 306 may additionally or alternatively include components other than those shown.

Peripherals 308 may be configured to allow vehicle 300 to interact with external sensors, other vehicles, external computing devices, and/or a user. To that end, peripherals 308 may include, for example, a wireless communication system 352, a touchscreen 354, a microphone 356, and/or a speaker 358.

Wireless communication system 352 may be any system configured to wirelessly couple to one or more other vehicles, sensors, or other entities, either directly or via a communication network. To that end, wireless communication system 352 may include an antenna and a chipset for communicating with the other vehicles, sensors, servers, or other entities either directly or via a communication network. The chipset or wireless communication system 352 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen 354 may be used by a user to input commands to vehicle 300. To that end, touchscreen 354 may be configured to sense at least one of a position and a movement of a user's finger via capacitive sensing, resistance sensing, or a surface acoustic wave process, among other possibilities. Touchscreen 354 may be capable of sensing finger movement in a direction parallel or planar to the touchscreen surface, in a direction normal to the touchscreen surface, or both, and may also be capable of sensing a level of pressure applied to the touchscreen surface. Touchscreen 354 may be formed of one or more translucent or transparent insulating layers and one or more translucent or transparent conducting layers. Touchscreen 354 may take other forms as well.

Microphone 356 may be configured to receive audio (e.g., a voice command or other audio input) from a user of vehicle 300. Similarly, speakers 358 may be configured to output audio to the user.

Computer system 310 may be configured to transmit data to, receive data from, interact with, and/or control one or more of propulsion system 302, sensor system 304, control system 306, and peripherals 308. To this end, computer system 310 may be communicatively linked to one or more of propulsion system 302, sensor system 304, control system 306, and peripherals 308 by a system bus, network, and/or other connection mechanism (not shown).

In one example, computer system 310 may be configured to control operation of transmission 322 to improve fuel efficiency. As another example, computer system 310 may be configured to cause camera 334 to capture images of the environment. As yet another example, computer system 310 may be configured to store and execute instructions corresponding to sensor fusion algorithm 344. As still another example, computer system 310 may be configured to store and execute instructions for determining a 3D representation of the environment around vehicle 300 using LIDAR unit 332. Thus, for instance, computer system 310 could function as a controller for LIDAR unit 332. Other examples are possible as well.

As shown, computer system 310 includes processor 312 and data storage 314. Processor 312 may comprise one or more general-purpose processors and/or one or more special-purpose processors. To the extent that processor 312 includes more than one processor, such processors could work separately or in combination.

Data storage 314, in turn, may comprise one or more volatile and/or one or more non-volatile storage components, such as optical, magnetic, and/or organic storage, and data storage 314 may be integrated in whole or in part with processor 312. In some embodiments, data storage 314 may contain instructions 316 (e.g., program logic) executable by processor 312 to cause vehicle 300 and/or components thereof (e.g., LIDAR unit 332, etc.) to perform the various operations described herein. Data storage 314 may contain additional instructions as well, including instructions to transmit data to, receive data from, interact with, and/or control one or more of propulsion system 302, sensor system 304, control system 306, and/or peripherals 308.

In some embodiments, vehicle 300 may include one or more elements in addition to or instead of those shown. For example, vehicle 300 may include one or more additional interfaces and/or power supplies. Other additional components are possible as well. In such embodiments, data storage 314 may also include instructions executable by processor 312 to control and/or communicate with the additional components. Still further, while each of the components and systems are shown to be integrated in vehicle 300, in some embodiments, one or more components or systems may be removably mounted on or otherwise connected (mechanically or electrically) to vehicle 300 using wired or wireless connections. Vehicle 300 may take other forms as well.

III. EXAMPLE METHODS

It is noted that the example arrangement described for system 100 and LIDAR 200 are not meant to be limiting. Thus, the methods and processes described herein can be used with a variety of different LIDAR configurations, including LIDAR device 200 as well as other LIDAR arrangements. In one example, the methods described herein can be used with a LIDAR device that includes a single optical window instead of two optical windows. In another example, the LIDAR device of the methods herein can be configured to repeatedly scan a different range of angles (e.g., repeatedly scan a range of horizontal angles, etc.) onto a light detector and/or in a different order and/or using different optical components than those described for LIDAR 200.

Additionally, in some examples, the methods and processes described herein can be used with a variety of different types of active sensors such as any of the active sensing systems in the description of system 100 (e.g., SONARs, RADARs, LIDARs, etc.).

Figure 4:
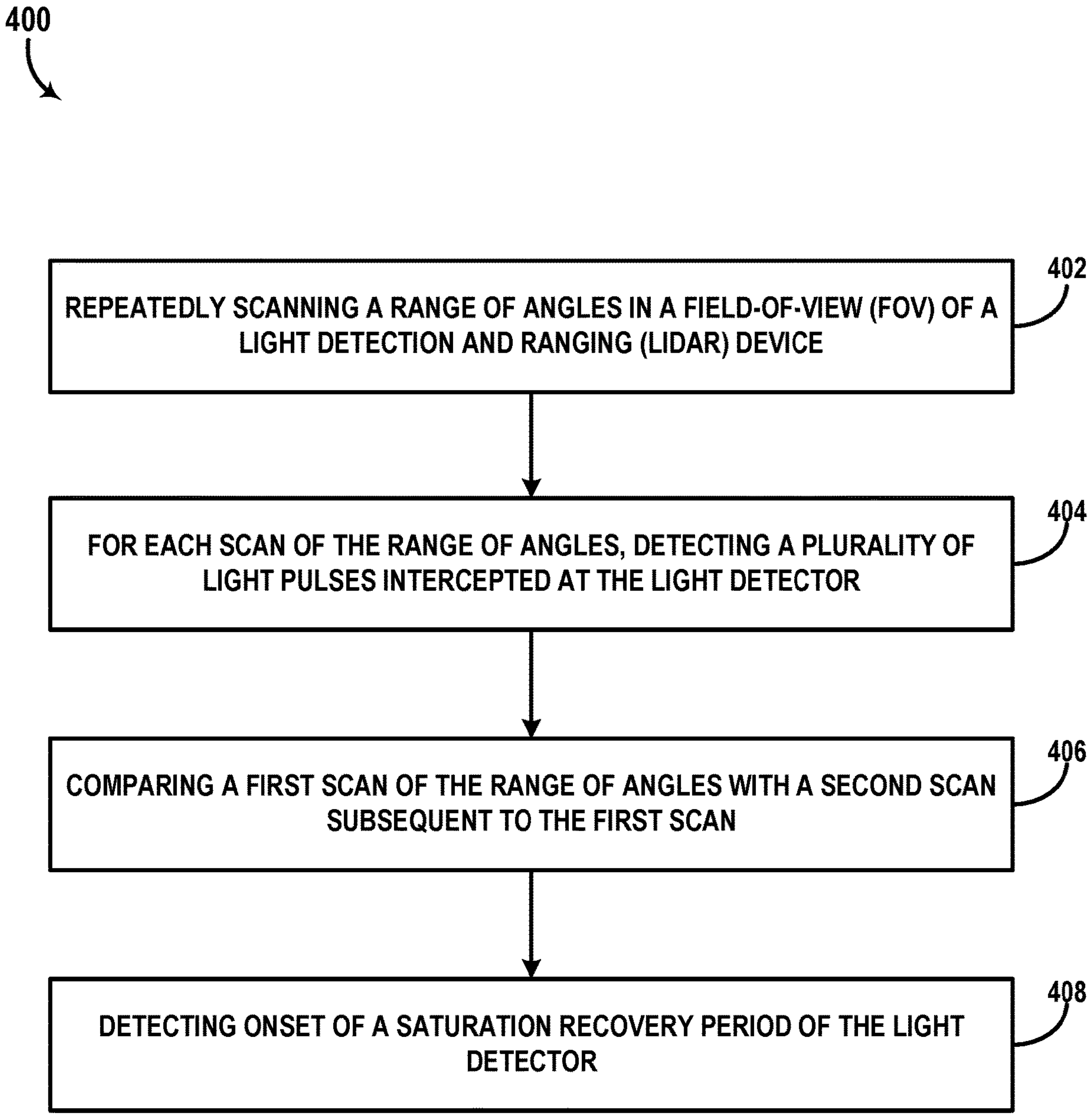
FIG. 4 is a flowchart of a method, according to example embodiments.

FIG. 4 is a flowchart of a method 400, according to example embodiments. Method 400 presents an embodiment of a method that could be used with any of system 100, device 200, and/or vehicle 300, for example. Method 400 may include one or more operations, functions, or actions as illustrated by one or more of blocks 402-408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 400 and other processes and methods disclosed herein, each block in FIG. 4 may represent circuitry that is wired to perform the specific logical functions in the process.

At block 402, method 400 involves repeatedly scanning a range of angles in a field-of-view (FOV) of a light detection and ranging (LIDAR) device at a light detector of the LIDAR device.

In a first example, referring back to FIG. 2D, LIDAR 200 may be configured to repeatedly scan a range of pitch angles in the FOV of LIDAR 200 by rotating mirror 244 about axis 215 to reflect light from the scene received from different pitch directions in the vertical FOV of LIDAR 200 (e.g., across a range of pitch angles that extends from −74 degrees to +21 degrees, or any other vertical FOV of LIDAR 200, etc.).

In a second example, the range of angles at block 402 may alternatively correspond to a subset of the vertical FOV of LIDAR 200. For example, the range of angles can be selected to correspond to angles between −45 degrees and −74 degrees (or any other subset of the vertical FOV).

In a third example, the range of angles at block 402 may correspond to a range of yaw angles. For example, the range of yaw angles of the light pulses received by LIDAR 200 during a rotation of rotating platform 210 from a first yaw angle to a second yaw angle can be selected as the range of angles at block 402. Other examples are possible.

At block 404, method 400 involves detecting a plurality of light pulses intercepted at the light detector for each scan of the range of angles.

In a first example, referring back to FIG. 2C, light emitter 222 may emit a series of light pulses 260, via mirror 244, toward the FOV. Referring now to FIG. 2D, reflected portions of the emitted light pulses that return from the FOV may be steered by mirror 244 toward detector 232 as the detected plurality of light pulses at block 404.

In a second example, the LIDAR device of method 400 may alternatively emit one or more light pulses that are not steered by mirror 244. For instance, a different emitter (not shown in FIG. 2C) than emitter 222 can be used to emit one or more light pulses toward a portion of the FOV that at least partially overlaps the range of angles of block 402. In this instance, the light detector of block 404 can then detect reflected portions of the one or more emitted light pulses from different angles of the illuminated portion of the FOV.

In a third example, the LIDAR device of method 400 may be configured to scan the range of angles without emitting light pulses (e.g., to detect incident light pulses emitted by an external device, etc.). Other examples are possible.

In some examples, method 400 may involve emitting one or more light pulses from the LIDAR device toward the FOV. In these examples, the detected plurality of light pulses at block 404 may comprise reflected portions of the one or more emitted light pulses that are reflected back to the LIDAR device from the FOV, in line with the discussion above.

In some examples, method 400 may involve detecting the plurality of light pulses at block 404 during a plurality of successive detection periods. In these examples, the light detector may be configured to intercept light from a different angle in the range of angles during each of the plurality of successive detection periods of the scan.

Referring back to FIG. 2D for example, light detector 232 may be configured to continuously scan incident light steered by mirror 244 from different angles in the FOV during a plurality of successive detection periods. For instance, referring back to FIG. 2C, after each light pulse is emitted by emitter 222, light detector 232 may listen for reflections of the emitted light pulse for a predetermined period of time (i.e., detection period). In this instance, emitter 222 may then emit a second light pulse at a different angle (e.g., due to the rotation of mirror 244) toward the FOV, and light detector 232 may then listen for reflections of the second emitted light pulse during a second detection period after the second light pulse is emitted, and so on.

At block 406, method 400 involves comparing a first scan of the range of angles with a second scan subsequent to the first scan.

Referring back to FIG. 2D for example, each scan of the range of angles may correspond to a vertical scan of the FOV of LIDAR 200 that is obtained by rotating mirror 244 to steer light from different angles between two ends of the vertical FOV of LIDAR 200. In this example, a second scan of the range of angles may correspond to a second subsequent scan of the same range of angles obtained by rotating mirror 244 to direct light from the same pitch angles in the vertical FOV onto light detector 232, and so on.

In this example, during each scan, light detector 232 may detect light pulses arriving from different pitch angles across the vertical FOV. LIDAR 200 may then measure light intensities (e.g., peak intensity, etc.) of each incident light pulse (as well as a corresponding receipt time of the pulse). In this example, the light intensities measured during each scan can then be compared to one another at block 406. For instance, the maximum light intensity value of any detected light pulse measured across the range of angles in the first scan can be compared with the maximum light intensity value of any detected light pulse measured across the range of angles during the second scan. Alternatively or additionally, for instance, other characteristics of the detected light pulses during each scan can be compared to one another (e.g., ranges, receipt times, etc.).

Thus, in some examples, comparing the first scan with the second scan at block 406 comprises comparing first light intensity measurements indicated by first outputs from the light detector for first light pulses detected during the first scan with second light intensity measurements indicated by second outputs form the light detector for second light pulses detected during the second scan, in line with the discussion above. Additionally, in some examples, comparing the first light intensity measurements with the second light intensity measurements may comprise comparing respective maximum values of the first light intensity measurements and the second light intensity measurements, in line with the discussion above.

At block 408, method 400 involves detecting onset of a saturation recovery period of the light detector.

In a first example, detecting the onset of the saturation recovery period at block 408 is based on the comparison at block 406.

Continuing with the example above for instance, if the comparison at block 406 indicates a discrepancy between the respective maximum values of the light intensity measurements in the first scan and the second scan, then a system of method 400 may determine that the light detector has entered into the saturated recovery period. In one example, detecting the onset of the saturation recovery period may be based on a difference between the respective maximum values being greater than a threshold difference (e.g., 60%). In this example, the system of method 400 may then determine that the detected light pulses in the second scan are significantly dimmer than the detected light pulses in the first scan, which may indicate that the second scan was obtained while the light detector is in the saturation recovery period. Thus, in some implementations, detecting onset of the saturation recovery period at block 408 may be based on a difference between the respective maximum values (i.e., of the first light intensity measurements in the first scan and the second light intensity measurements in the second scan) being greater than a threshold difference (e.g., 40%, 50%, 60%, 70%, or any other threshold difference), in line with the discussion above.

Alternatively or additionally, in a second example, method 400 also involves monitoring a supply voltage (or power consumption or output electrical current) of the light detector while repeatedly scanning the range of angles at block 402; and detecting the onset of the saturation recovery period at block 408 based on detection of a threshold change in the supply voltage (or power consumption or output electrical current) of the light detector. For instance, the light detector may include a SiPM or other type of device that transmits a relatively higher current when it enters a saturation state.

Alternatively or additionally, in a third example, method 400 also involves monitoring a temperature of the light detector while repeatedly scanning the range of angles at block 402; and detecting the onset of the saturation recovery period at block 408 based on detection of a threshold change in the temperature of the light detector. For instance, the light detector may include a SiPM or other type of device that transmits heat energy when it enters a saturation state;

and the LIDAR device may include a temperature sensor that measures a temperature of the light detector to detect the onset of the saturation state (and the saturation recovery period).

Alternatively or additionally, in a fourth example, method 400 also involves monitoring a breakdown voltage of the light detector while repeatedly scanning the range of angles at block 402; and detecting the onset of the saturation recovery period at block 408 based on detection of a threshold change to the breakdown voltage of the light detector. Other examples are possible.

In some examples, method 400 may also involve determining a time-of-flight of an emitted light pulse, emitted from the LIDAR device toward the FOV and at least partially reflected back from the FOV toward the LIDAR device as a detected light pulse of the plurality of light pulses detected at block 404, based on at least a light intensity measurement indicated by output from the light detector for the detected light pulse.

By way of example, a system of method 400 (e.g., system 100, LIDAR 200, etc.) may include circuitry coupled to the light detector and configured to trigger collection of an output signal (e.g., voltage, current, etc.) of the light detector at or near a peak of the detected light pulse indicated in the output signal. For instance, the circuitry may include a comparator that triggers collection of an output from an analog-to-digital converter (ADC) when a time derivative of the output signal from the light detector crosses a small threshold (e.g., between 0-0.1, etc.). The ADC value collected when the comparator triggers collection may correspond to an intensity of the light pulse prior to reaching the peak. To correct for this error (e.g., "range walk error"), the system of method 400 may use calibration data (e.g., stored in data storage 108, 314, etc.) that relates the intensity measurement with a range error (or range walk error), to more accurately estimate a receipt time of a peak of the detected light pulse (and/or the determined time-of-flight of the detected light pulse).

In some examples, method 400 may also involve determining whether the detected light pulse is detected at the light detector during the saturation recovery period. In these examples, determining the time-of-flight of the detected light pulse may be also based on the determination of whether the detected light pulse is detected during the saturation recovery period. Continuing with the example above, if the detected light pulse was detected during the saturation recovery period, the system of method 400 may use different calibration data to map the light intensity measurement with a range value or range walk error value that is suitable for measurements collected during the saturation recovery period.

Figure 5:
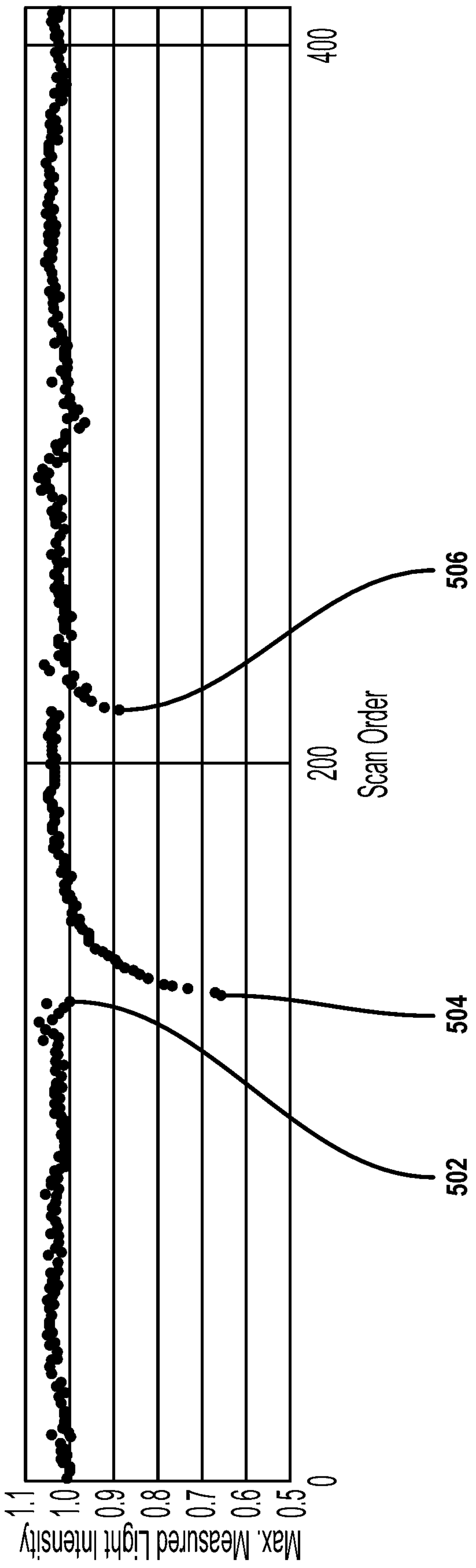
FIG. 5 is a conceptual illustration of light intensity measurements indicated by a light detector that repeatedly scans a range of angles in a FOV of a LIDAR device, according to example embodiments.

FIG. 5 is a conceptual illustration of light intensity measurements indicated by a light detector that repeatedly scans a range of angles in a FOV of a LIDAR device, according to example embodiments. Specifically, each point in the graph of FIG. 5 may represent the maximum value of light intensity measurements during a single scan of a range of angles by a light detector. For purposes of illustration, the values in the vertical axis (i.e., maximum light intensity measurement of scan) are normalized to values between 0.5 and 1.1. The values in the horizontal axis represent the order of each scan in a sequence of consecutive scans of the range of angles by the same light detector.

Referring back to FIG. 2D by way of example, each point in the graph of FIG. 5 may represent the maximum light intensity measurement indicated by output for light detector 232 for any light pulse detected from any pitch angle during a full single scan of a vertical FOV of LIDAR 200 (i.e., the intensity of a light pulse reflected from the brightest and/or nearest object to LIDAR 200 during the scan, etc.).

As shown in FIG. 5, most of the maximum light intensity measurements in each scan have a normalized value of approximately 1.0. However, during some scans, the maximum measured intensity significantly decreases relative to the maximum measured intensity in a previous scan. For example, during scan 502, the maximum intensity measurement by the light detector was near the normalized value of 1.0. However, in the subsequent scan 504, the maximum value of the measured light intensities detected during scan 504 was significantly lower (normalized value of approximately 0.65). Additionally, in one or more subsequent scans after scan 504, relatively low maximum intensity measurements for the detected light pulses across the same scanned range of angles were also indicated by the light detector. This "dimming" behavior of the light detector may indicate that the light detector was operating during a saturation recovery period during at least scan 504 and one or more other subsequent scans.

In accordance with the present disclosure, some example methods herein may involve detecting onset of a saturation recovery period of the light detector that performs the scans of FIG. 5 based on a comparison of the light intensity measurements indicated by the light detector in consecutive scans (e.g., scans 502 and 504) of the same range of angles.

As noted above, some example methods herein may detect the onset of the saturation recovery period based on a difference between the maximum values of light intensity measurements in two consecutive scans being greater than a threshold difference. In FIG. 5 for instance, the threshold difference may be exceeded between scan 502 and 504; but not between scan 506 and the scan that precedes scan 506.

In other examples, an example method herein may involve detecting the onset of the saturation recovery period based on the maximum value of light intensities measured during a scan being less than a detection threshold. In FIG. 5 for example, the detection threshold may correspond to a normalized maximum light intensity value of 0.7. In this example, scan 504 may trigger detection of the onset of the saturation recovery period; whereas, scan 506 may not trigger such detection due to the maximum measured value at scan 506 being above the detection threshold (e.g., normalized value of approximately 0.9).

Other threshold differences and/or detection thresholds are possible as well.

Figure 6:
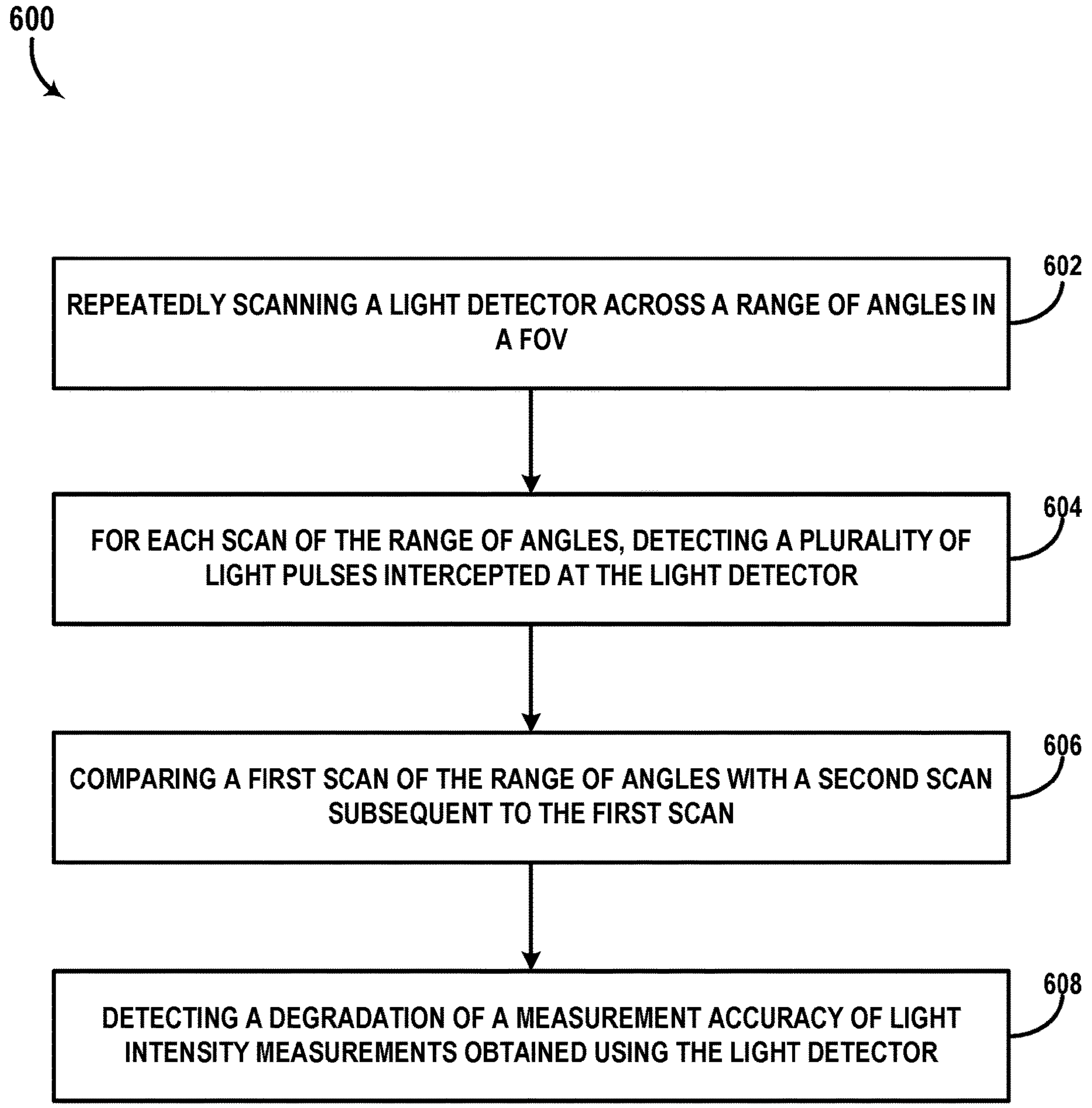
FIG. 6 is a flowchart of another method, according to example embodiments.

FIG. 6 is a flowchart of another method 600, according to example embodiments. Method 600 presents an embodiment of a method that could be used with any of system 100, device 200, vehicle 300, and/or methods 400, for example. Method 600 may include one or more operations, functions, or actions as illustrated by one or more of blocks 602-606. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 602, method 600 involves repeatedly scanning a light detector across a range of angles in a field-of-view (FOV) of a light detection and ranging (LIDAR) device.

Referring back to FIG. 2D for example, light detector 232 may be scanned across different pitch angles in the range of angles within a vertical FOV of LIDAR 200 by rotating steering mirror 244 about pitch axis 215, in line with the discussion above. Alternatively or additionally, light detector 232 may be scanned across different yaw angles in the range of angles within a horizontal FOV of LIDAR 200 by rotating platform 210 about yaw axis 219, in line with the discussion above.

Thus, in some examples, the LIDAR device (e.g., LIDAR 200) may include one or more optical elements (e.g., mirror 244, receive lens 242, etc.) configured to direct light from the range of angles toward the light detector (e.g., light detector 232).

At block 604, method 600 involves detecting a plurality of light pulses intercepted at the light detector for each scan of the range of angles. For example, block 604 may be similar to block 404 of method 400.

At block 606, method 600 involves comparing a first scan of the range of angles by the light detector with a second scan subsequent to the first scan. For example, block 606 may be similar to block 406 of method 400.

At block 608, method 600 involves detecting a degradation of a measurement accuracy of the light intensity measurements obtained using the light detector.

In some examples, detecting the degradation at block 608 is based on the comparison at block 606. Referring back to FIG. 5 for example, the first scan at block 606 may correspond to scan 502 and the second scan may correspond to scan 504. In this example, a system or device of method 400 may determine that a threshold change in the respective maximum light pulse intensity measurements of scans 502 and 504 indicates a potential physical degradation in the measurement accuracy of the light detector (or other circuitry, such as ADCs, comparators, etc., that collect the measurements from the light detector) that performs scans 502 and 504 of the same range of angles. As another example, if the maximum light intensity measurement of the second scan increases by more than a threshold relative to the first scan, then the system or device of method 600 may also detect a degradation associated with a potential defect in the light detector (or in other circuitry, such as ADCs, comparators, etc., that collect the measurements from the light detector).

In other examples, detecting the degradation at block 608 may be based on a temperature, supply voltage, power consumption, and/or any of the other indicators for detecting a saturation state of the light detector described at block 408 of method 400.

In some examples, method 600 involves generating operation instructions for a vehicle that includes the LIDAR device. For example, vehicle 300 may include the LIDAR device of method 600 (e.g., as part of LIDAR unit 332). Thus, for instance, computer system 310 may use data from the LIDAR device (and/or one or more other sensors of sensor system 304) to generate the operation instructions for operating vehicle 300. To that end, the generated operation instructions may relate to any of the functions described in connection with control system 306, such as navigation instructions for navigating vehicle 300 in the environment (e.g., navigation/pathing system 348, obstacle avoidance system 350, etc.), instructions for operating one or more components of sensor system 304 (e.g., adjusting the FOVs scanned by the respective sensors, etc.), among other examples.

In some examples, method 600 involves modifying the generated operation instructions in response to detecting the degradation at block 608 (and/or in response to detecting onset of a saturation recovery period of the light detector). In a first example, vehicle 300 may select or assign another sensor of sensor system 304 to scan (at least part of) a portion of the FOV that was scanned while the light detector is in the saturation recovery period. In a second example, vehicle 300 may modify navigation instructions (e.g., previously generated for navigating the vehicle in an autonomous mode) to stop the vehicle until the reliability of the LIDAR device can be verified. In a third example, vehicle 300 may provide (e.g., via touchscreen 354) a message for display to a user of vehicle 300 (e.g., the message may alert the user that the LIDAR device is malfunctioning, etc.). In a fourth example, vehicle 300 may operate wireless communication system 352 to report the detected degradation to a remote server that processes calibration and/or maintenance requests for vehicle 300. Other examples are possible.

Thus, in some examples, a vehicle herein may be configured to operate in an autonomous or semi-autonomous mode based at least in part on sensor data collected by the LIDAR device of method 600. In these examples, one or more operations of the vehicle can be adjusted to account for the detection and/or identification of the degradation and/or onset of a saturation recovery period of the light detector and/or the LIDAR device.

In some examples, method 600 involves identifying one or more scans of the range of angles that are obtained during a saturation recovery period of the light detector. Referring back to FIG. 5 for example, scan 504 and one or more other subsequent scans can be identified as the one or more scans obtained during the saturation recovery period based on having maximum measured intensity values that are less than a threshold (e.g., less than a normalized value of 0.8, etc.).

Figure 7:
FIG. 7 is a conceptual illustration of a point cloud representation of a FOV scanned using a LIDAR device, according to example embodiments.

FIG. 7 is a conceptual illustration of a point cloud representation 700 of a FOV scanned using a LIDAR device, according to example embodiments. For example, each point in point cloud 700 may be determined (e.g., via a time-of-flight computation) to represent a distance to a reflective surface that reflected a corresponding detected light pulse of the detected plurality of light pulses described at blocks 404 of method 400 and/or block 604 of method 600.

In an example scenario, point cloud 700 may correspond to a FOV scanned by a LIDAR positioned at a side of vehicle 300. In this scenario, point cloud 700 may show a given vehicle adjacent to vehicle 300 and a road under the given vehicle. In line with the discussion above, points in the point cloud that are computed based on data collected while the light detector is in a saturation recovery period may have inaccurate locations such as the points representing the portion 702 of the road underneath the given vehicle. For instance, a shiny retroreflector on the side of the given vehicle (e.g., road stud retroreflectors, etc.) may have caused the light detector to become saturated and enter the saturation recovery period while scanning portion 702. Other examples are possible.

Figure 8:
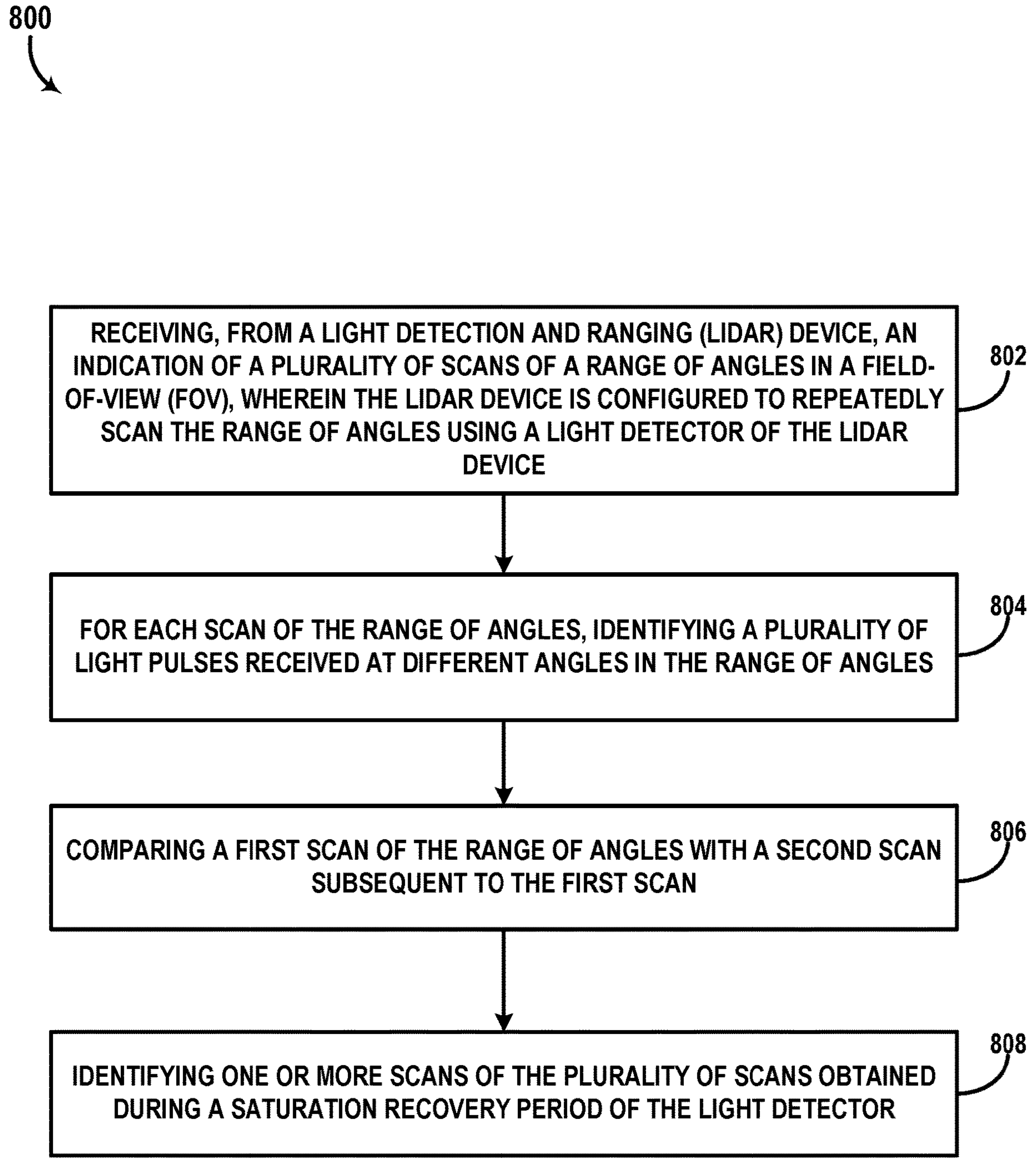
FIG. 8 is a flowchart of yet another method, according to example embodiments.

FIG. 8 is a flowchart of yet another method 800, according to example embodiments. Method 800 presents an embodiment of a method that could be used with any of system 100, device 200, vehicle 300, and/or methods 400, 600, for example. Method 800 may include one or more operations, functions, or actions as illustrated by one or more of blocks 802-808. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 802, method 800 involves receiving, from a LIDAR device, an indication of a plurality of scans of a range of angles in a FOV. The LIDAR device may be configured to repeatedly scan the range of angles using a light detector of the LIDAR device.

Referring back to FIG. 3 for example, computer system 310 may receive data indicative of the plurality of scans from LIDAR 332, which are obtained by LIDAR 332 in line with the discussion at block 402 of method 400 and/or block 602 of method 600.

At block 804, method 800 involves identifying a plurality of light pulses received at different angles in the range of angles for each scan of the range of angles. For instance, the plurality of light pulses may be intercepted at the light detector from different angles of the FOV for each scan of the range of angles. For example, block 804 may be similar to block 404 of method 400 and/or block 604 of method 600.

At block 806, method 800 involves comparing a first scan of the range of angles with a second scan subsequent to the first scan. For example, block 806 may be similar to block 406 of method 400 and/or block 606 of method 600.

At block 808, method 800 involves identifying one or more scans of the plurality of scans obtained during a saturation recovery period of the light detector.

In some examples, identifying the one or more scans at block 808 is based on the comparison at block 806. Referring back to FIG. 5 for example, scan 504 and one or more other subsequent scans can be identified as the one or more scans obtained during the saturation recovery period based on having maximum measured intensity values that are less than a threshold (e.g., less than a normalized value of 0.8, etc.).

In other examples, identifying the one or more scans at block 808 may be based on monitoring a temperature, supply voltage, output current, power consumption, breakdown voltage, and/or any of the other indicators described at blocks 408 of method 400 and/or block 608 of method 600 for detecting a saturation state of the light detector.

In some examples, method 800 involves detecting foreign object debris (FOD) in the FOV of the LIDAR device based on at least an apparent size of the FOD indicated by data from the LIDAR device being less than an FOD detection threshold. Referring back to FIG. 7 for example, small objects (e.g., smaller than an FOD detection threshold of five centimeters or any other FOD threshold) on the road underneath the given vehicle shown in point cloud 700 can be identified as FOD.

In some examples, method 800 involves generating a three-dimensional (3D) representation of the FOV based on at least light intensity measurements indicated by outputs from the light detector for the plurality of light pulses detected at block 804. For example, a computer system (e.g., computer system 310 of vehicle 300) can process data from the LIDAR device to generate the point cloud representation 700 of FIG. 7. Further, in line with the discussion at block 408 of method 400, each point in point cloud 700 may represent a distance to a reflective surface that reflected one of the detected plurality of light pulses that is determined using a time-of-flight computation that accounts for a "range walk error" or "range error" based on the corresponding light intensity measurement indicated by the light detector for the detected light pulse of that point.

In these examples, method 800 may also optionally involve excluding the foreign object debris (FOD) from the generated 3D representation. For example, small objects that are less than the FOD detection threshold (e.g., height of five centimeters, or any other FOD detection threshold) can be removed from the generated 3D representation of the FOV.

In some examples, method 800 may also optionally involve adjusting the FOD detection threshold for the one or more scans identified at block 808 (the one or more scans obtained during the saturation recovery period of the light detector). Referring back to FIG. 7 for example, the FOD detection threshold can be increased (e.g., from five centimeters to ten centimeters, or any other original and adjusted FOD detection threshold values) for the one or more scans associated with region 702 of point cloud 700. In this way, for instance, the apparent bump" in the road represented by point cloud 700 in the region 702 can be filtered out or excluded from the generated 3D representation because it is likely that it is not actual bump in the road but rather an artifact caused by the degraded measurement accuracy of the light detector during the saturation recovery period.

In some examples, method 800 may involve detecting onset of the saturation recovery period of the light detector, in line with the discussion at block 408 of method 400 and block 608 of method 600. In these examples, a system of method 800 may adjust one or more operations of the system related to FOD detection.

In a first example, method 800 may involve adjusting the FOD detection threshold in response to detecting the onset of the saturation recovery period. For instance, a controller of the LIDAR device (e.g., controller 100 of system 100) may detect the onset of the saturation recovery period by comparing the maximum intensity measurements of multiple scans (e.g., scans 502 and 504 shown in FIG. 5), in line with the discussion above. Controller 104 may then transmit a signal to a computer system that generates a 3D representation of the FOV using data from the LIDAR device (e.g., computer system 310 of vehicle 300). In response to receiving the signal, the computer system may adjust the FOD detection threshold used for detected light pulses received while the light detector is in the saturation recovery period (e.g., scan 504 and one or more other subsequent scans).

In some scenarios, adjusting the FOD detection threshold may facilitate reducing FOD false detections. For instance, referring back to FIG. 7, portion 702 of point cloud 700 may indicate the presence of a "bump" in the ground underneath the wheel of a vehicle. However, in this scenario, the "bump" may correspond to a distortion in the point cloud data (rather than an actual object on the ground). For instance, the "bump" distortion may relate to errors in time-of-flight computations for light pulses detected during the saturation recovery period. Thus, continuing with the example above, the computer system can use the adjusted FOD detection threshold to exclude the "bump" in the ground from being identified as FOD.

In a second example, method 800 may involve identifying the one or more scans at block 808 occurring during the saturation recovery period based on a given time of the onset of the saturation recovery period. Referring back to FIG. 5 for instance, a system of method 800 may determine the given time of the onset of the saturation recovery period as being the given time of scan 504 due to a difference between the maximum light intensity values of consecutive scans 502 and 504 exceeding a difference threshold. The system may then select scan 504 and one or more subsequent scans occurring within a threshold time period after the given time of scan 504 as the one or more scans identified at block 808. Further, for instance, the system may then exclude any FOD detections associated with the identified one or more scans as potentially false FOD detections related to a detector saturation event (or adjust the FOD detection threshold used for the one or more scans).

In a third example, method 800 may involve detecting FOD based on a difference between an apparent ground height indicated by consecutive scans of the range of angles and further based on detecting the onset of the saturation recovery period. Referring back to FIG. 7 for instance, a relatively sharp increase in the ground height (i.e., the beginning of the bump in the road within portion 702 of point cloud 700) may trigger detection of FOD. In this instance however, if the time of the detection of that relatively sharp increase in ground height coincides with the given time of the onset of the saturation recovery period, then a system of method 800 may exclude it and/or one or more subsequent FOD detections associated with a predetermined number of scans (e.g., scans 504 and one or more subsequent scans) from the onset of the saturation recovery period as potentially false FOD detections. Further, in this instance, the system may identify one or more other FOD detections that occur after the predetermined number of scans as potentially true FOD detections. For instance, FOD detections that occur during a later portion of the saturation recovery period can still be identified as potentially true FOD detections (e.g., if the difference between respective apparent ground heights indicated by consecutive scans during the later portion of the saturation recovery period exceed the difference threshold). Through this process for instance, the system may detect FOD (e.g., a log on the ground, etc.) even if they were scanned during the saturation recovery period.

In a fourth example, method 800 may involve detecting FOD during the saturation recovery period based on one of the first scan or the second scan. For instance, a system of method 800 may attempt to detect, during the saturation recovery period, the presence of a "bump" in the road based on a single scan of the range of angles (e.g., a single vertical line of points in the point cloud, etc.). In this way, the system may mitigate the effect of distance offset errors associated with the saturation recovery period. For instance, adjacent data points indicated by the single scan may be based on a series of successive light pulses detected by the light detector within a relatively shorter period of time (as compared to a longer period of time in which the same bump is scanned twice during two full scans of the same range of angles).

IV. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

The specification includes the following subject-matter, expressed in the form of clauses 1-20: 1. A method comprising: repeatedly scanning a range of angles in a field-of-view (FOV) of a light detection and ranging (LIDAR) device; for each scan of the range of angles, detecting a plurality of light pulses intercepted at a light detector of the LIDAR device during a plurality of successive detection periods, wherein the light detector is configured to intercept light from a different angle in the range of angles during each of the plurality of successive detection periods of the scan; comparing a first scan of the range of angles obtained using the light detector with a second scan subsequent to the first scan; and based on the comparison, detecting onset of a saturation recovery period of the light detector during the first scan or the second scan. 2. The method of clause 1, further comprising: emitting one or more light pulses from the LIDAR device toward the FOV, wherein the detected plurality of light pulses comprise reflected portions of the one or more emitted light pulses that are reflected back to the LIDAR device from the FOV. 3. The method of clause 1 or 2, further comprising: identifying one or more scans of the range of angles that are obtained during the saturation recovery period of the light detector. 4. The method of any of clauses 1-3, wherein comparing the first scan with the second scan comprises comparing first light intensity measurements indicated by first outputs from the light detector for first light pulses detected during the first scan with second light intensity measurements indicated by second outputs from the light detector for second light pulses detected during the second scan. 5. The method of clause 4, wherein comparing the first light intensity measurements with the second light intensity measurements comprises comparing respective maximum values of the first light intensity measurements and the second light intensity measurements. 6. The method of clause 5, wherein detecting onset of the saturation recovery period is based on a difference between the respective maximum values exceeding a threshold difference. 7. The method of any of clauses 1-6, further comprising: determining, based on at least a light intensity measurement indicated by output from the light detector for a detected light pulse of the detected plurality of light pulses, a time-of-flight of an emitted light pulse emitted from the LIDAR device toward the FOV and at least partially reflected back from the FOV toward the LIDAR device as the detected light pulse. 8. The method of clause 7, further comprising: determining whether the detected light pulse is detected at the light detector during the saturation recovery period, wherein determining the time-of-flight is further based on the determination of whether the detected light pulse is detected during the saturation recovery period. 9. The method of any of clauses 1-8, further comprising: detecting foreign object debris (FOD) in the FOV of the LIDAR device based on at least an apparent size of the FOD indicated by data from the LIDAR device being less than an FOD detection threshold. 10. The method of clause 9, further comprising: generating a three-dimensional (3D) representation of the FOV based on at least light intensity measurements indicated by outputs from the light detector for the detected plurality of light pulses; and excluding the FOD from the generated 3D representation of the FOV. 11. The method of clause 9 or 10, further comprising: in response to detecting the onset of the saturation recovery period, adjusting the FOD detection threshold for one or more scans of the range of angles obtained during the saturation recovery period of the light detector. 12. A light detection and ranging (LIDAR) device comprising: a light detector; one or more optical elements configured to direct light received by the LIDAR device from a field-of-view (FOV) onto the light detector; a controller configured to cause the LIDAR device to perform operations comprising: repeatedly scanning the light detector across a range of angles in the FOV; for each scan of the range of angles, detecting a plurality of light pulses intercepted at the light detector during a plurality of detection periods, wherein the light detector is configured to intercept light from a different angle in the range of angles during each of the plurality of detection periods of the scan; comparing a first scan of the range of angles obtained using the light detector with a second scan subsequent to the first scan; and based on the comparison, detecting onset of a saturation recovery period of the light detector. 13. The LIDAR device of clause 12, further comprising: a light emitter configured to emit one or more light pulses toward the FOV, wherein the detected plurality of light pulses correspond to reflected portions of the one or more emitted light pulses that are reflected back from the FOV toward the LIDAR device. 14. The LIDAR device of clause 12 or 13, wherein the one or more optical elements comprise: a rotating mirror configured to direct the light received by the LIDAR device from different angles toward the light detector based on corresponding rotational positions of the rotating mirror. 15. A method comprising: receiving, from a light detection and ranging (LIDAR) device, an indication of a plurality of scans of a range of angles in a field-of-view (FOV), wherein the LIDAR device is configured to repeatedly scan the range of angles using a light detector of the LIDAR device; for each scan of the range of angles, identifying a plurality of light pulses received at different angles in the range of angles, wherein the plurality of light pulses are intercepted at the light detector during different detection periods in the scan; comparing a first scan of the range of angles obtained using the light detector with a second scan subsequent to the first scan; and based on the comparison, identifying one or more scans of the plurality of scans obtained during a saturation recovery period of the light detector. 16. The method of clause 15, wherein comparing the first scan with the second scan comprises comparing first light intensity measurements indicated by first outputs from the light detector for first light pulses detected during the first scan with second light intensity measurements indicated by second outputs from the light detector for second light pulses detected during the second scan. 17. The method of clause 16, wherein comparing the first light intensity measurements with the second light intensity measurements comprises comparing respective maximum values of the first light intensity measurements and the second light intensity measurements. 18. The method of any of clauses 15-17, further comprising: detecting foreign object debris (FOD) in the FOV of the LIDAR device based on at least an apparent size of the FOD indicated by data from the LIDAR device being less than an FOD detection threshold. 19. The method of clause 18, further comprising: generating a three-dimensional (3D) representation of the FOV based on at least light intensity measurements indicated by outputs from the light detector for the detected plurality of light pulses; and excluding the FOD from the generated 3D representation of the FOV. 20. The method of clause 18 or 19, further comprising: adjusting the FOD detection threshold for the identified one or more scans of the range of angles obtained during the saturation recovery period of the light detector.

What is claimed is:

1. A method comprising:

repeatedly scanning a range of angles in a field-of-view (FOV) of a light detection and ranging (LIDAR) device;

for each scan of the range of angles, detecting a plurality of light pulses intercepted at a light detector of the LIDAR device during a plurality of successive detection periods, wherein the light detector is configured to intercept light from a different angle in the range of angles during each of the plurality of successive detection periods of the scan;

generating a three-dimensional (3D) representation of the FOV based on at least light intensity measurements indicated by outputs from the light detector for the detected plurality of light pulses;

comparing a first scan of the range of angles obtained using the light detector with a second scan subsequent to the first scan;

based on the comparison, detecting onset of a saturation recovery period of the light detector during the first scan or the second scan;

in response to detecting the onset of the saturation recovery period, adjusting a detection threshold to provide an adjusted detection threshold for the saturation recovery period;

detecting an apparent object in a region of the FOV scanned during the saturation recovery period; and excluding the apparent object from the generated 3D representation of the FOV based on the adjusted detection threshold for the saturation recovery period.

2. The method of claim 1, further comprising:

emitting one or more light pulses from the LIDAR device toward the FOV, wherein the detected plurality of light pulses comprise reflected portions of the one or more emitted light pulses that are reflected back to the LIDAR device from the FOV.

3. The method of claim 1, further comprising:

identifying one or more scans of the range of angles that are obtained during the saturation recovery period of the light detector.

4. The method of claim 1, wherein comparing the first scan with the second scan comprises comparing first light intensity measurements indicated by first outputs from the light detector for first light pulses detected during the first scan with second light intensity measurements indicated by second outputs from the light detector for second light pulses detected during the second scan.

5. The method of claim 4, wherein comparing the first light intensity measurements with the second light intensity measurements comprises comparing respective maximum values of the first light intensity measurements and the second light intensity measurements.

6. The method of claim 5, wherein detecting onset of the saturation recovery period is based on a difference between the respective maximum values exceeding a threshold difference.

7. The method of claim 1, further comprising:

determining, based on at least a light intensity measurement indicated by output from the light detector for a detected light pulse of the detected plurality of light pulses, a time-of-flight of an emitted light pulse emitted from the LIDAR device toward the FOV and at least partially reflected back from the FOV toward the LIDAR device as the detected light pulse.

8. The method of claim 7, further comprising:

determining whether the detected light pulse is detected at the light detector during the saturation recovery period, wherein determining the time-of-flight is further based on the determination of whether the detected light pulse is detected during the saturation recovery period.

9. The method of claim 1, wherein the apparent object is an artifact caused by degraded measurement accuracy of the light detector during the saturation recovery period.

10. The method of claim 1, wherein the apparent object is a bump in a road.

11. The method of claim 1, wherein the detection threshold comprises a size threshold, and wherein adjusting the detection threshold to provide an adjusted detection threshold for the saturation recovery period comprises increasing the size threshold to provide an adjusted size threshold.

12. The method of claim 11, wherein excluding the apparent object from the generated 3D representation of the FOV based on the adjusted detection threshold for the saturation recovery period comprises:

excluding the apparent object from the generated 3D representation of the FOV based on an apparent size of the apparent object indicated by data from the LIDAR device being less than the adjusted size threshold.

13. The method of claim 1, wherein the detection threshold is a foreign object debris (FOD) detection threshold.

14. A method comprising:

receiving, from a light detection and ranging (LIDAR) device, an indication of a plurality of scans of a range of angles in a field-of-view (FOV), wherein the LIDAR device is configured to repeatedly scan the range of angles using a light detector of the LIDAR device;

for each scan of the range of angles, identifying a plurality of light pulses received at different angles in the range of angles, wherein the plurality of light pulses are intercepted at the light detector during different detection periods in the scan;

generating a three-dimensional (3D) representation of the FOV based on at least light intensity measurements indicated by outputs from the light detector for the detected plurality of light pulses;

comparing a first scan of the range of angles obtained using the light detector with a second scan subsequent to the first scan;

based on the comparison, identifying one or more scans of the plurality of scans obtained during a saturation recovery period of the light detector;

in response to detecting the onset of the saturation recovery period, adjusting a detection threshold to provide an adjusted detection threshold for the saturation recovery period;

detecting an apparent object in a region of the FOV scanned during the saturation recovery period; and excluding the apparent object from the generated 3D representation of the FOV based on the adjusted detection threshold for the saturation recovery period.

15. The method of claim 14, wherein comparing the first scan with the second scan comprises comparing first light intensity measurements indicated by first outputs from the light detector for first light pulses detected during the first scan with second light intensity measurements indicated by second outputs from the light detector for second light pulses detected during the second scan.

16. The method of claim 15, wherein comparing the first light intensity measurements with the second light intensity measurements comprises comparing respective maximum values of the first light intensity measurements and the second light intensity measurements.

17. The method of claim 14, wherein the detection threshold comprises a size threshold, wherein adjusting the detection threshold to provide an adjusted detection threshold for the saturation recovery period comprises increasing the size threshold to provide an adjusted size threshold, and wherein excluding the apparent object from the generated 3D representation of the FOV based on the adjusted detection threshold for the saturation recovery period comprises:

excluding the apparent object from the generated 3D representation of the FOV based on an apparent size of the FOD indicated by data from the LIDAR device being less than the adjusted size threshold.

18. A light detection and ranging (LIDAR) device comprising:

a light detector;

one or more optical elements configured to direct light received by the LIDAR device from a field-of-view (FOV) onto the light detector;

a controller configured to cause the LIDAR device to perform operations comprising:

repeatedly scanning the light detector across a range of angles in the FOV;

for each scan of the range of angles, detecting a plurality of light pulses intercepted at the light detector during a plurality of detection periods, wherein the light detector is configured to intercept light from a different angle in the range of angles during each of the plurality of detection periods of the scan;

generating a three-dimensional (3D) representation of the FOV based on at least light intensity measurements indicated by outputs from the light detector for the detected plurality of light pulses;

comparing a first scan of the range of angles obtained using the light detector with a second scan subsequent to the first scan;

based on the comparison, detecting onset of a saturation recovery period of the light detector;

in response to detecting the onset of the saturation recovery period, adjusting a detection threshold to provide an adjusted detection threshold for the saturation recovery period;

detecting an apparent object in a region of the FOV scanned during the saturation recovery period; and excluding the apparent object from the generated 3D representation of the FOV based on the adjusted detection threshold for the saturation recovery period.

19. The LIDAR device of claim 18, further comprising:

a light emitter configured to emit one or more light pulses toward the FOV, wherein the detected plurality of light pulses correspond to reflected portions of the one or more emitted light pulses that are reflected back from the FOV toward the LIDAR device.

20. The LIDAR device of claim 18, wherein the one or more optical elements comprise:

a rotating mirror configured to direct the light received by the LIDAR device from different angles toward the light detector based on corresponding rotational positions of the rotating mirror.

* * * * *